(12) United States Patent
Andon et al.

(10) Patent No.: US 12,061,707 B2
(45) Date of Patent: Aug. 13, 2024

(54) WEARABLE ARTICLE WITH INTEGRATED DISPLAY FOR DISPLAYING CRYPTOGRAPHICALLY SECURED DIGITAL IMAGES

(71) Applicant: NIKE, Inc., Beaverton, OR (US)

(72) Inventors: Christopher Andon, Portland, OR (US); Manan Goel, Portland, OR (US); Bobby LeGaye, Portland, OR (US); Randal J. Marsden, Milpitas, CA (US); Andrew Owenson, Portland, OR (US); Mirza Sabanovic, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/470,407

(22) Filed: Sep. 19, 2023

(65) Prior Publication Data
US 2024/0012915 A1    Jan. 11, 2024

Related U.S. Application Data

(60) Provisional application No. 63/408,090, filed on Sep. 19, 2022.

(51) Int. Cl.
*G06F 21/60* (2013.01)
*H04L 9/40* (2022.01)

(52) U.S. Cl.
CPC ........ *G06F 21/602* (2013.01); *H04L 63/0428* (2013.01)

(58) Field of Classification Search
CPC .................. G06F 21/602; H04L 63/0428
See application file for complete search history.

(56) References Cited

U.S. PATENT DOCUMENTS

| | | | |
|---|---|---|---|
| 11,182,467 B1 * | 11/2021 | Medina | G06F 3/147 |
| 11,348,152 B1 * | 5/2022 | Davis | G06Q 30/0601 |
| 2007/0193070 A1 * | 8/2007 | Bertagna | A43B 3/34 36/132 |
| 2008/0252415 A1 * | 10/2008 | Larson | E05B 19/0005 340/5.73 |
| 2009/0272013 A1 * | 11/2009 | Beers | A43B 3/0078 36/137 |

(Continued)

FOREIGN PATENT DOCUMENTS

EP    3333835 A1    6/2018

*Primary Examiner* — Vance M Little
(74) *Attorney, Agent, or Firm* — Quinn IP Law

(57) ABSTRACT

A method of displaying a cryptographically secured digital collectable on a digital display includes receiving the cryptographically secured digital collectable; receiving an indication from a user to display the cryptographically secured digital collectable on the digital display provided on an article of footwear or apparel; receiving an article identifier from communication circuitry provided on the article of footwear in response to receiving the indication to display the digital collectable on the article of footwear or apparel; transmitting the cryptographically secured digital collectable to the article of footwear or apparel for display on the digital display; and recording or requesting the recordation that the cryptographically secured digital collectable is displayed in connection with the article identifier of the article of footwear or apparel.

20 Claims, 17 Drawing Sheets

(56) References Cited

U.S. PATENT DOCUMENTS

| | | | |
|---|---|---|---|
| 2010/0223816 A1* | 9/2010 | Barfield | A43B 3/36 |
| | | | 345/87 |
| 2012/0044190 A1* | 2/2012 | Yilmaz | G06F 3/044 |
| | | | 345/173 |
| 2018/0241864 A1 | 8/2018 | Males et al. | |
| 2021/0058758 A1 | 2/2021 | Carter et al. | |
| 2022/0211140 A1* | 7/2022 | Vasilev | A43B 3/48 |
| 2022/0309491 A1* | 9/2022 | Shapiro | G06F 21/64 |
| 2022/0366476 A1* | 11/2022 | Penner | G06Q 30/0631 |
| 2023/0004125 A1* | 1/2023 | Knock | G06Q 20/321 |
| 2023/0055835 A1* | 2/2023 | Pacella | H04L 9/3213 |
| 2023/0377056 A1* | 11/2023 | Yang | G06Q 50/01 |
| 2024/0078536 A1* | 3/2024 | Dashkov | G06Q 20/36 |

* cited by examiner

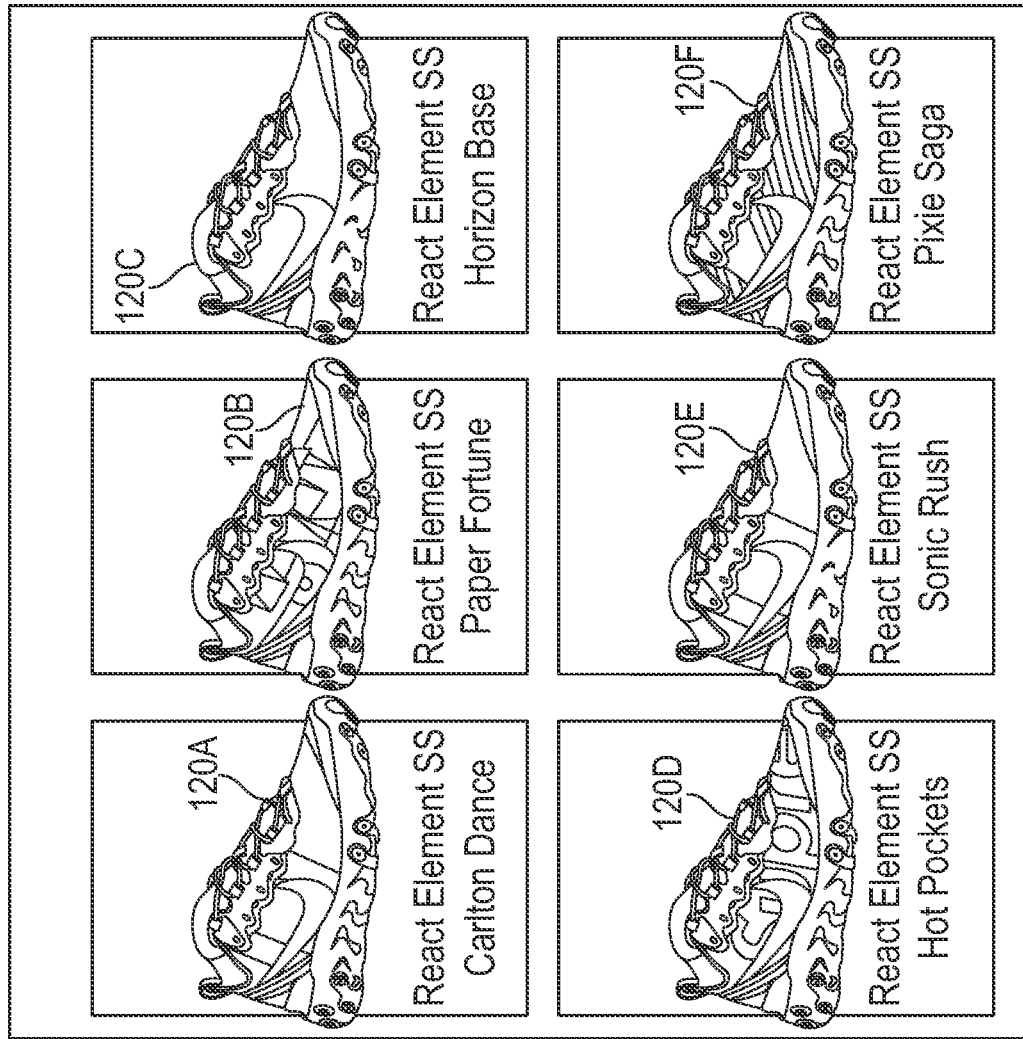
FIG. 12
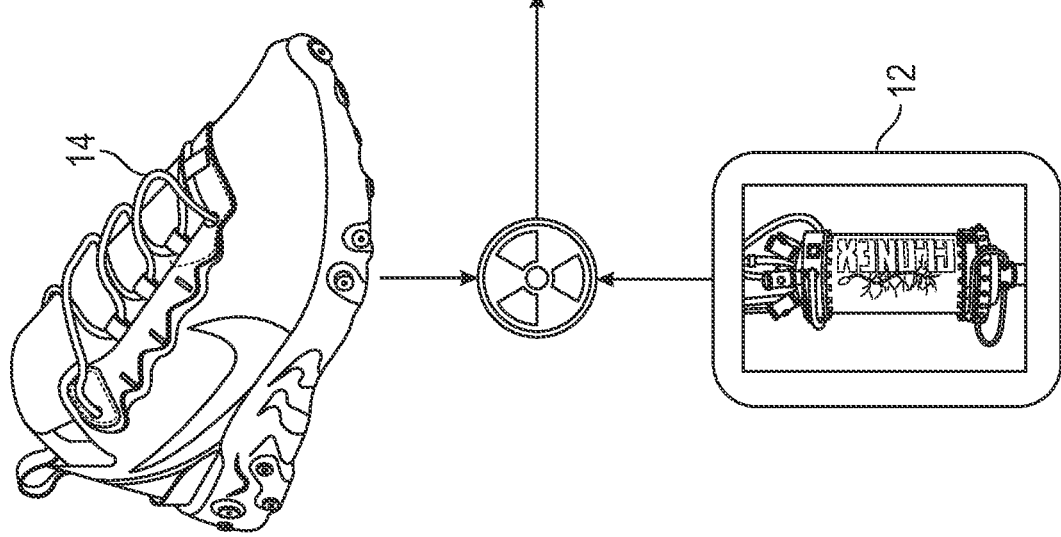

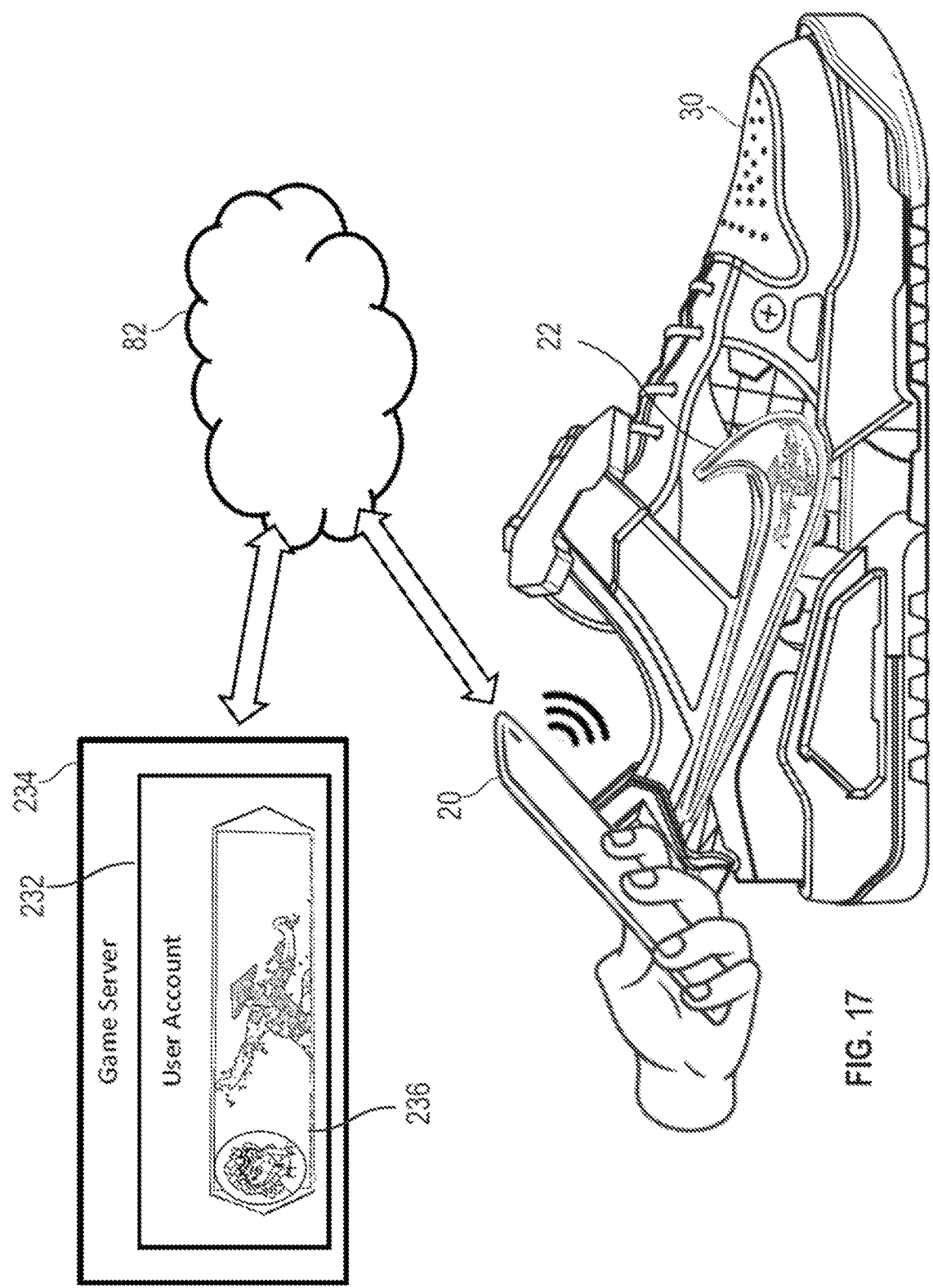

WEARABLE ARTICLE WITH INTEGRATED DISPLAY FOR DISPLAYING CRYPTOGRAPHICALLY SECURED DIGITAL IMAGES

CROSS REFERENCE TO RELATED APPLICATIONS

The present application claims the benefit of priority from U.S. Provisional Patent Application No. 63/408,090, filed on 19 Sep. 2022, which is incorporated by reference in its entirety.

TECHNICAL FIELD

The present disclosure generally relates to the incorporation of NFT images and/or digital collectables into real world articles.

BACKGROUND

A non-fungible token (NFT) is a non-interchangeable (i.e., non-fungible) record that is digitally stored and is capable of being sold or traded between different market participants. In many instances, an NFT can serve as a digital certificate of authenticity or proof of ownership in a corresponding digital or physical item (e.g., a "digital collectable"). The records comprising the NFT are often stored in/on an immutable digital ledger, such as a blockchain-style ledger, which can be broken up across many different nodes or ledger-maintaining participants. Such blockchain ledgers will use some means of cryptology to encode at least a portion of the contents of the record, while also referencing the prior block (in the chain of blocks) to provide continuity.

NFTs typically include resident data, referred to as metadata, that is stored directly on the blockchain. Due to cost complexities associated with pushing large quantities of data through the transaction validation process, the metadata may often include a pointer or reference to off-chain data/digital files such as photos, graphics, videos, and/or audio that would be cost-prohibitive to store on-chain. When the NFT is displayed, such as on a user's social media account or in a user's digital wallet, an associated software program may review the metadata, and then digitally retrieve the associated photo from the referenced file repository for display. It is often these photos or models that are viewed as the "digital collectable," with its authenticity or ownership verified through the blockchain registration (i.e., a cryptographically secured digital image). As used herein, the term "digital collectable" is intended to refer strictly to a unique, electronically stored digital image, model, or colorway, whereas the term "NFT" is intended to refer to a type of digital collectable that is cryptograpically secured/tokenized on a suitable blockchain-style digital ledger. As such, many times throughout this disclosure, the term NFT may be used in a generic sense to refer to the secured digital collectable that is displayed. In these instances, the disclosure should not be read imply that a full blockchain record is also displayed via a display.

BRIEF DESCRIPTION OF THE DRAWINGS

FIG. 12 is a schematic flow diagram of a generic NFT being applied to a physical article to result in one of a plurality of different final visual appearances.

FIG. 17 is a schematic diagram of a user receiving a digital collectable/gamer tag from a user account on a video game server and controlling a display on an article of footwear to display an image that is representative of the received digital collectable/gamer tag.

DETAILED DESCRIPTION

Broadly speaking, the concepts described herein provide a unique opportunity to augment physical articles, such as articles of footwear or apparel, personal accessories, or wearables by displaying digital images, NFTs, digital collectables, or other digital identities or accomplishments on the article itself. Through this display, users may gain a new way of accessorizing physical articles, while also gaining an increased level of interactivity and participation with virtual items, such as digital collectibles and NFTs that had historically been relegated to purely digital realms. Under the present architecture/method, digital collectibles and/or NFTs may be used or displayed on, or in conjunction with a physical article (i.e., an article existing within the real world). In a preferred configuration, the physical article is an article that is intended to be worn on the body of a user (i.e., a "wearable"), however, this should not preclude the presently described systems from being used with non-wearable articles. As discussed, the present technology utilizes display technology that can attach to or otherwise be integrated into the physical article to provide the user with the ability to augment, alter, or ordain the physical article according to one or more attributes or images associated with the digital collectible/NFT. In doing so, this technology creates a new avenue for brand engagement and user participation, whereby digital collectibles are no longer relegated strictly to digital environments.

Figure 1:
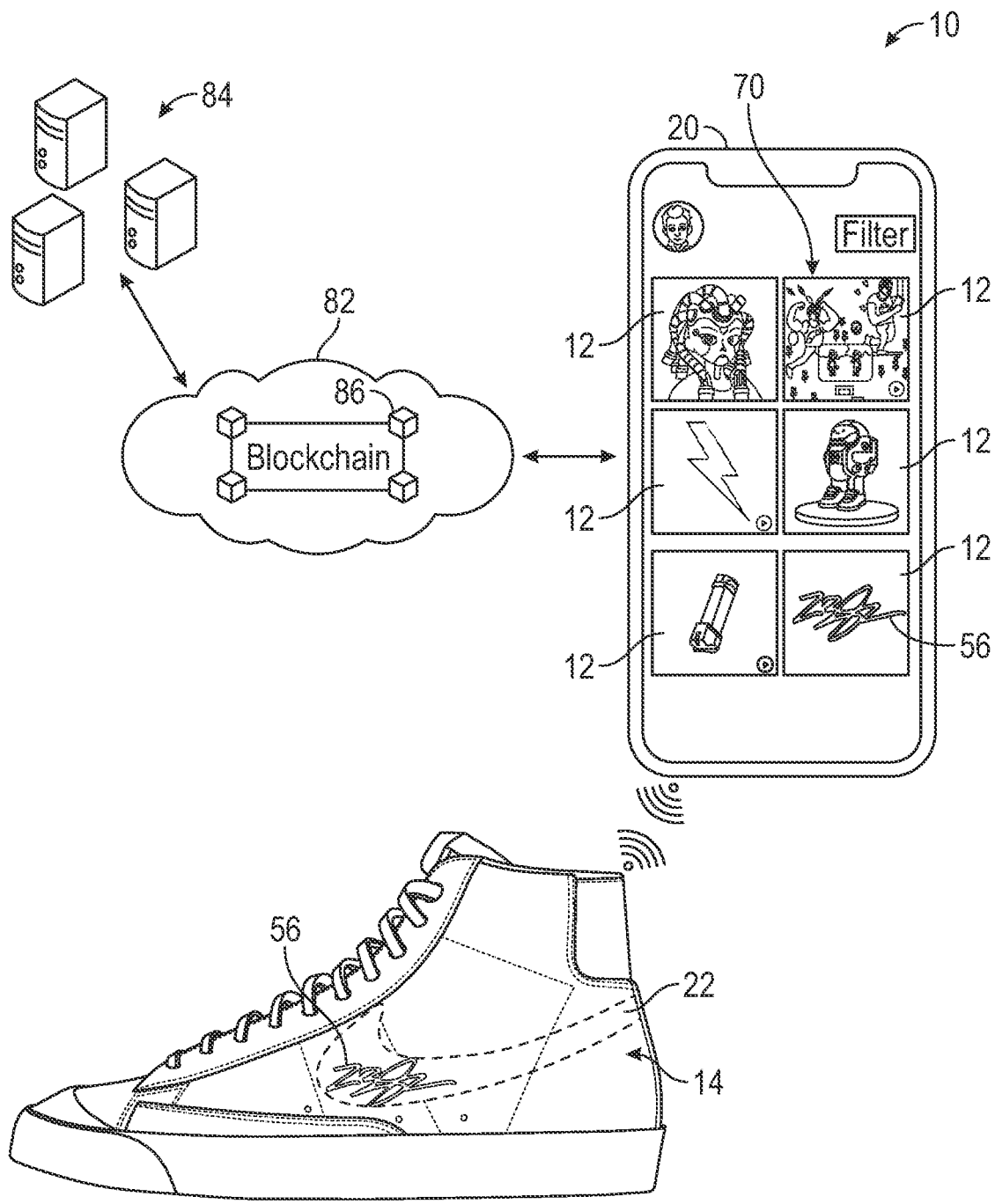
FIG. 1 is a schematic diagram of a system for displaying and registering an NFT or digital collectable on a physical article such as an article of footwear.

Referring to the drawings, FIG. 1 schematically illustrates a system 10 that is configured to integrate an NFT or digital collectable 12 into a physical article 14 within the real world. In one configuration, the physical article 14 may be an article of footwear or apparel that is operative to receive and display the digital collectable 12. As will be discussed in greater detail below, to properly display the NFT 12, the article 14 may include the requisite communications circuitry and/or processing capabilities to receive a digital image from an external computing device 20, display controller circuitry to convert this received signal into a form that is suitable to alter an integrated display 22 and the requisite power delivery circuitry (including power receiving circuitry and/or one or more electrochemical power storage elements) to permit the communications, processing, and display control electronics to operate. At the direction of a user operating the external computing device 20 (e.g., a smartphone), the present system 10 is operative to wirelessly push an NFT image to the article, where that image may be displayed or may operatively change an appearance of the article using the article-integrated display technology.

Article of Footwear

Figure 2:
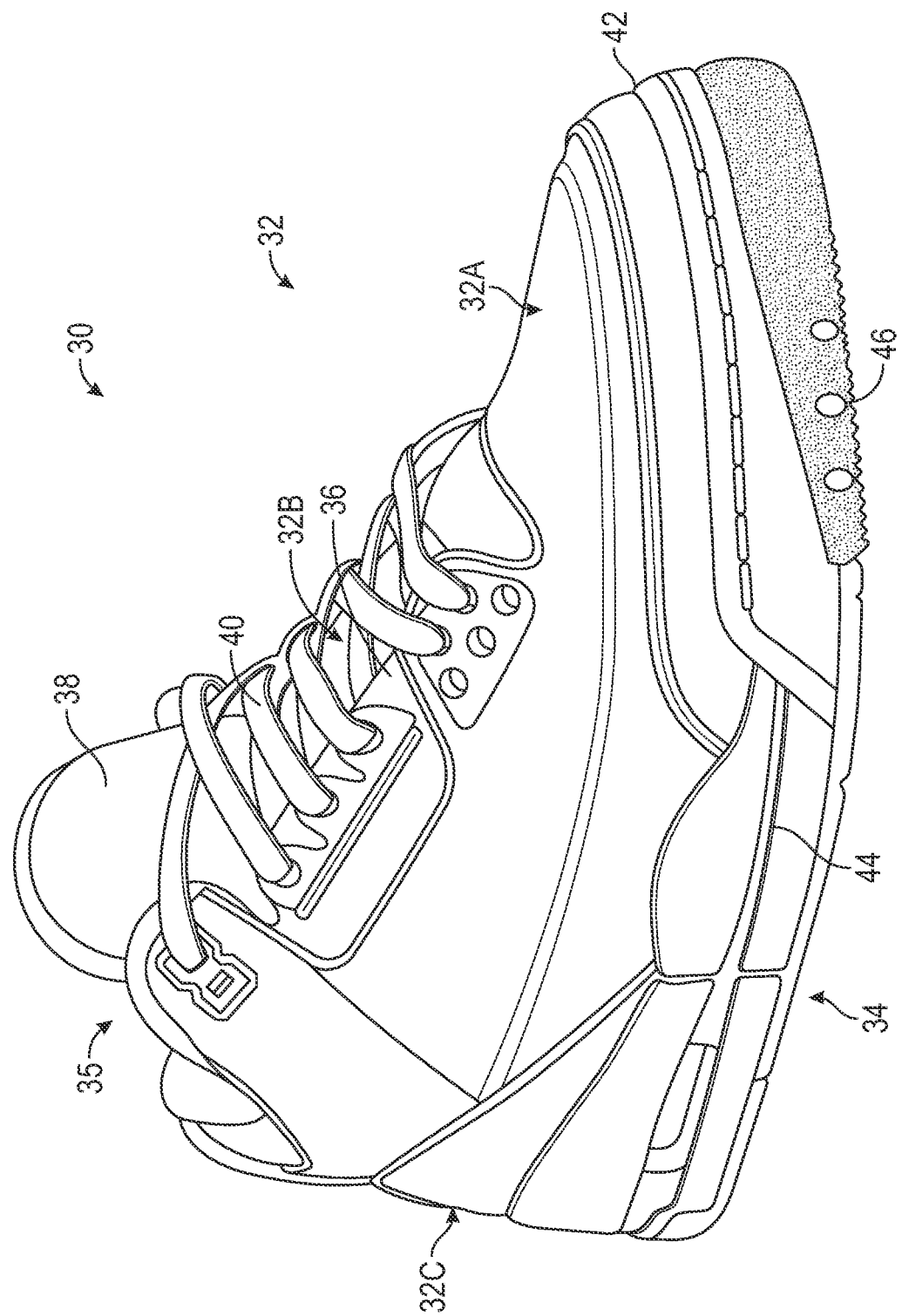
FIG. 2 is a schematic perspective view of an article of footwear.

FIG. 2 further illustrates a representative wearable article of footwear that may be used with the present system to outwardly display a linked NFT or digital collectable 12. The illustrated article of footwear 30—also referred to herein as "footwear" or "shoe" for brevity—is merely an exemplary application with which novel aspects and features of this disclosure may be practiced. Recognizably, the shape, size, material composition, and method of manufacture of the shoe 30 may be varied, singly or collectively, to accommodate practically any conventional or nonconventional footwear application.

With continued reference to FIG. 2, the article of footwear generally includes an upper 32 coupled to a subjacent sole structure 34. The upper 32 is depicted as having a shell-like, closed toe and heel configuration for encasing a human foot. Upper 32 of FIG. 2 is generally defined by three adjoining sections, namely a toe box 32A, a vamp 32B and a rear quarter 32C. The toe box 32A is shown as a rounded forward tip of the upper 32 that extends from distal to proximal phalanges to cover and protect the user's toes. By comparison, the vamp 32B is an arched midsection of the upper 32 that is located aft of the toe box 32A and extends from the metatarsals to the cuboid. As shown, the vamp 32B also provides a series of lace eyelets 36 and a shoe tongue 38. Positioned aft of the vamp 32B is a rear quarter 32C that extends from the transverse tarsal joint to the calcaneus bone and includes the rear portions of the upper 32. While portrayed in the drawings as comprising three primary segments, the upper 32 may be fabricated as a single-piece construction or may be composed of any number of segments, including a toe cap, heel cap, ankle cuff, interior liner, etc. For sandal and slipper applications, the upper 32 may take on an open toe or open heel configuration or may be replaced with a single strap or multiple interconnected straps.

The upper 32 portion of the footwear 30 may be fabricated from any one or combination of a variety of materials, such as textiles, engineered foams, polymers, natural and synthetic leathers, etc. Individual segments of the upper 32, once cut to shape and size, may be stitched, adhesively bonded, fastened, welded or otherwise joined together to form an interior void for comfortably receiving a foot. The individual material elements of the upper 32 may be selected and located with respect to the footwear 30 in order to impart desired properties of durability, air-permeability, wear-resistance, flexibility, appearance, and comfort, for example. An ankle opening 35 in the rear quarter 32C of the upper 32 provides access to the interior of the shoe 30. A shoelace 40, strap, buckle, or other conventional mechanism may be utilized to modify the girth of the upper 32 to more securely retain the foot within the interior of the shoe 30 as well as to facilitate entry and removal of the foot from the upper 32. Shoelace 40 may be threaded through a series of eyelets 36 in or attached to the upper 32; the tongue 38 may extend between the lace 40 and the interior void of the upper 32.

Sole structure 34 is rigidly secured to the upper 32 such that the sole structure 34 extends between the upper 32 and a support surface upon which a user would stand. The sole structure 34 may be fabricated as a sandwich structure with a top-most insole 42, an intermediate midsole 44, and a bottom-most outsole 46 or outsole surface. Alternative sole configurations may be fabricated with greater or fewer than three layers. Insole 42 is shown located partially within the interior void of the footwear 30, operatively attached at a lower portion of the upper 32, such that the insole 42 abuts a plantar surface of the foot. Underneath the insole 42 is a midsole 44 that incorporates one or more materials or embedded elements that enhance the comfort, performance, and/or ground-reaction-force attenuation properties of footwear 30. These elements and materials may include, individually or in any combination, a polymer foam material, such as polyurethane or ethylene-vinyl acetate (EVA), filler materials, moderators, air-filled bladders, plates, lasting elements, or motion control members. Outsole 46 is located underneath the midsole 24, defining some or all of the bottom-most, ground-engaging portion of the footwear 30. The outsole 46 may be formed from a natural or synthetic rubber material that provides a durable and wear-resistant surface for contacting the ground. In addition, the outsole 46 may be contoured and textured to enhance the traction (i.e., friction) properties between footwear 30 and the underlying support surface.

While FIG. 1 illustrates the present technology with respect to an article of footwear, in other embodiments the article 14 may comprise in article of apparel, including but not limited to shirts, pants, shorts, outerwear, headgear, gloves, or a personal accessory such as a bag, pouch, sash, or the like. Similarly, the present technology may also be used in conjunction with other articles 14 such as cars, trucks, or motorcycles, plush toys, refrigerator magnets, bookmarks, business cards, name badges, and the like. The present disclosure is provided for illustrative purposes, and similar teachings can be used on other physical articles.

Display and Electronics Integration

Figure 3:
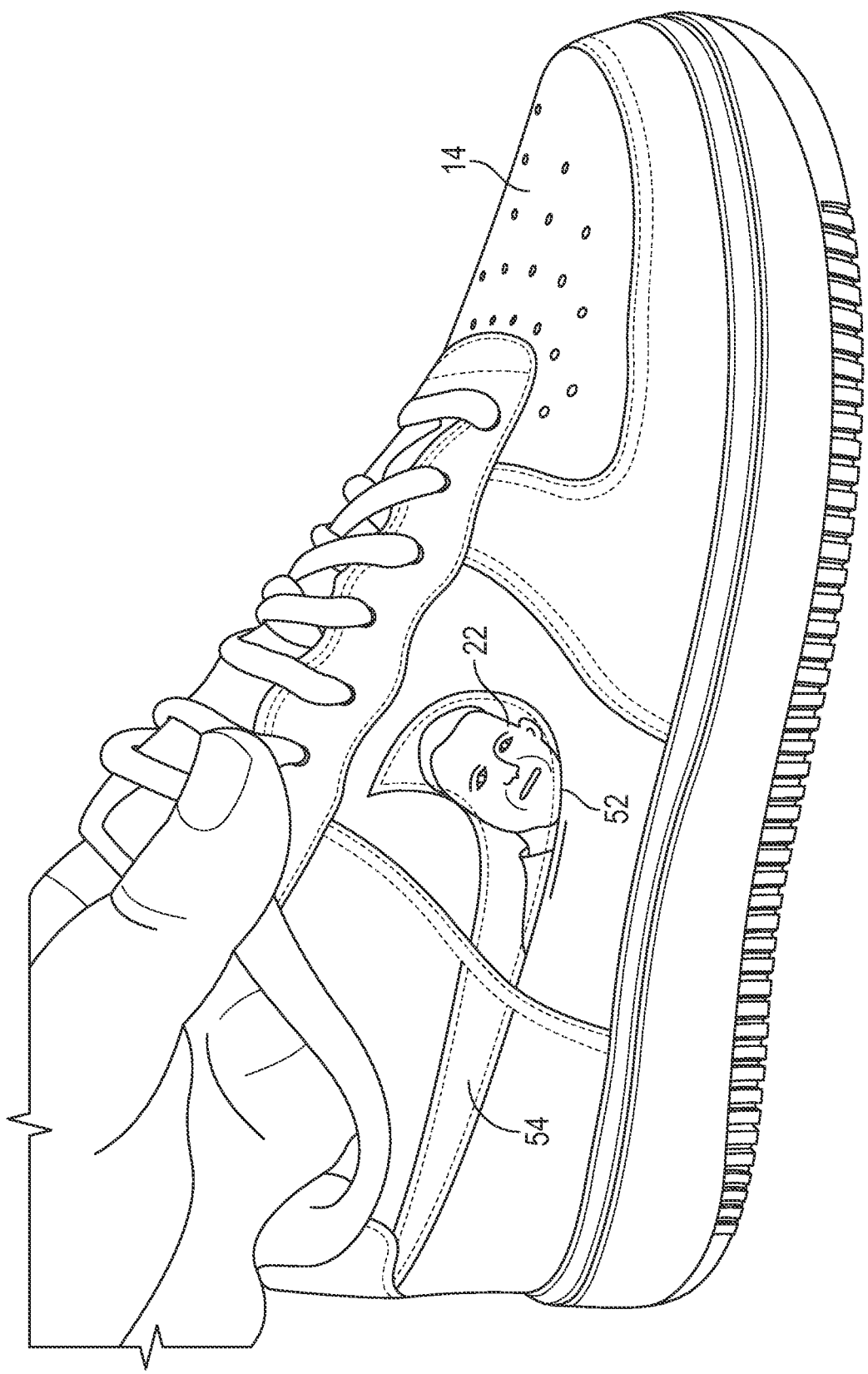
FIG. 3 is a schematic side perspective view of an article of footwear with a display integrated into a portion of a logo.
Figure 4:
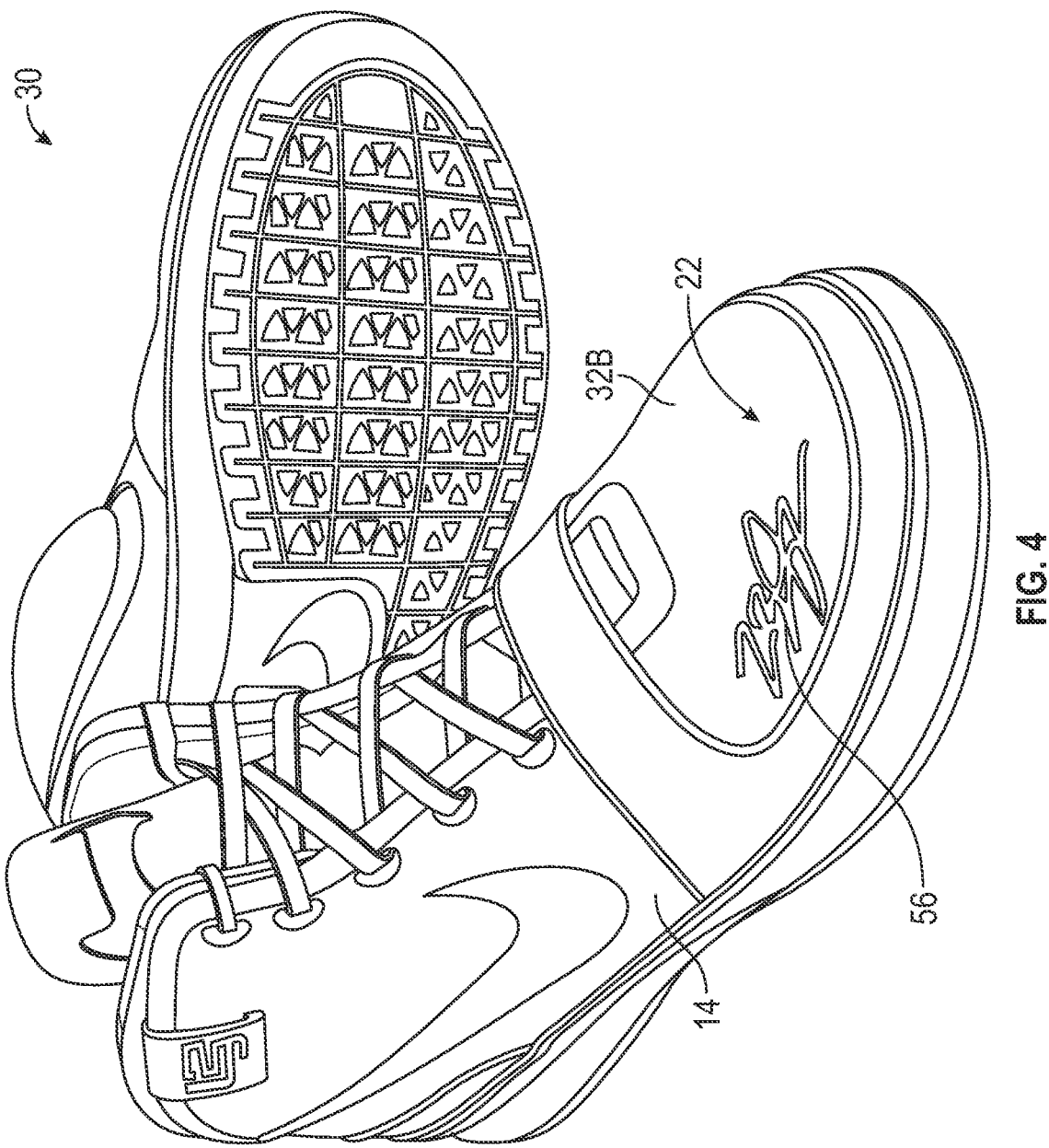
FIG. 4 is a schematic top perspective view of an article of footwear with a display integrated into a vamp portion of the article.
Figure 5:
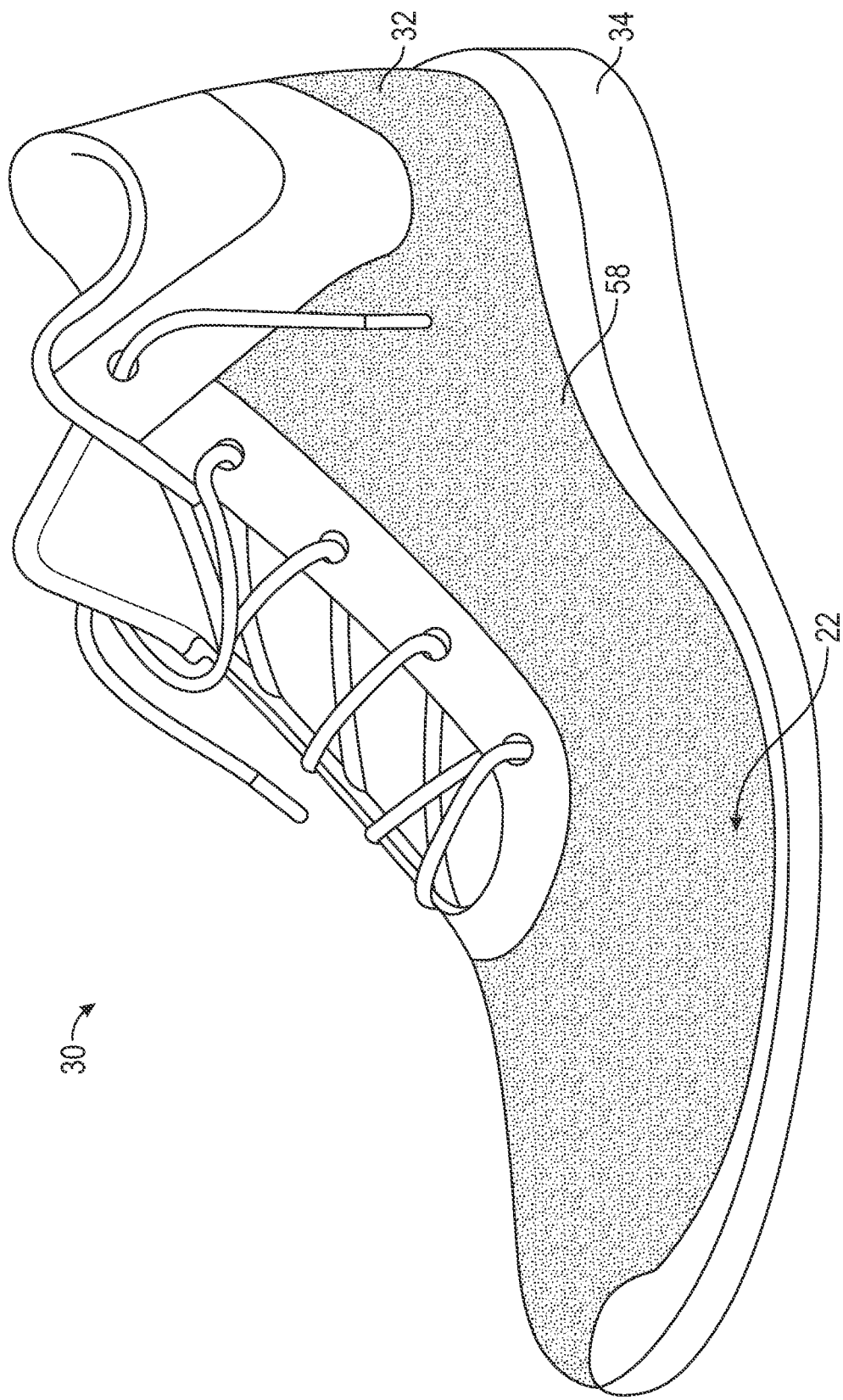
FIG. 5 is a schematic side perspective view of an article of footwear with a display integrated into a majority of the outer surface of an upper of an article of footwear.

As generally illustrated in FIGS. 3-5, when used in conjunction with an article of footwear, the display 22 may be integrated into or otherwise attached to an outward facing/outer surface 50 of the article 14 so that it may be viewed by others when worn. For example, in one embodiment, the display 22 may be incorporated into a portion of the outer surface of the upper such that it forms a portion of the outer surface. In another embodiment, the display 22 may be selectively attached to a portion of the outer surface of the upper. In the embodiments shown in FIGS. 1 and 3, the display 22 comprises a discrete display device that is limited to a comparatively small portion of the overall exterior of the shoe (i.e., less than about 20% of the outer surface, by area; or less than about 10% of the outer surface, by area; or even less than about 5% of the outer surface, by area). In these particular examples, the outer perimeter 52 of the display 22 may coincide with the silhouette or outer periphery of at least a portion of a logo 54.

In the embodiment illustrated in FIG. 4, the display 22 is integrated into a portion of the vamp 32B. In this particular embodiment (as well as in FIG. 1), an NFT athlete autograph 56 is digitally applied to the physical article 14. In this example a uniquely authenticated autograph may be applied to the shoe to provide a similar uniqueness as if the athlete actually autographed the shoe with a marker.

In other embodiments, such as generally shown in FIG. 5, the display 22 may be more of a wide area surface display 58 that extends across one or more panels or large portions of the outer surface. For example, in one embodiment, the surface display 58 may form, or otherwise cover, one or more of the vamp, toe cap, front quarter, heel counter, tongue, collar, and/or logo (though should not be strictly limited to those sections). In this embodiment, the surface display 58 may form a comparatively large portion of the upper 32 such that the display 58 can alter the external appearance or colorway of the shoe as a whole. For example, in some embodiments, a wide area surface display 58 may form or cover more than about 30% of the outer surface of the upper 32, by area; or more than about 40% of the outer surface of the upper 32, by area; or even more than about 50% of the outer surface of the upper 32, by area. In some embodiments, the wide area surface display 58 may be integrated into the textile used to form the article, which would provide a more natural external appearance/feel.

In any of the above-described embodiments, the display (generally referred to at 22) itself may comprise any suitable reflective and/or emissive display technology that may be suitable for the application and location on the article. In some embodiments, factors such as power consumption, parasitic draw, visibility, flexibility, and tactile impression may be driving factors in selecting a proper display. For example, in an article of footwear, a comparatively small display positioned on a lateral sidewall may not need to be exceptionally flexible. If the display were to be wrapped across a broader portion of the shoe, such as the entire sidewall, toe box, or around the ankle collar, then flexibility is a much more important factor to consider.

In one configuration, to reduce the need for on-board power storage, the display 22 may comprise an electronic ink display, such as, but not limited to an electrophoretic display (EPD), a microencapsulated electrophoretic display, an active-matrix electrophoretic display (AMEPD), an electrowetting display (EWD), an electrofluidic display, an interferometric modulator display, a plasmonic electronic display, or any similar style display. Typical electronic ink displays have very low operational power requirements due to their nature as reflective-style displays that require low or no holding current to maintain an image once the image is set. In some embodiments, larger panels may comprise a spray-on style electronic ink display that is applied over a base substrate (e.g., knit, leather, fabric, etc.).

In other embodiments, the display 22 may comprise a low-power emissive display, such as an organic light-emitting diode (OLED) based display. OLED displays operate without the need for a backlight, and are capable of being formed on flexible backings, such as thin films or even textiles. In still other embodiments, the display may comprise a multi-layered display, with an inner-layer formed from an electronic ink display and an outer-layer comprising an emissive OLED display (or vice versa). In such an embodiment, the electronic ink display may provide a no-power-draw static image and the emissive display may selectively apply one or more visual effects over top (e.g., where the effects may be selectively activated when the article is worn/used and deactivated to conserve power when the article is not worn/used). In one embodiment, the article of footwear 30 may include one or more motion, acceleration, or foot strike/impact sensors that may be in electrical communication with the display 22 and may be utilized to trigger one or more selective visual effects. Examples of such sensors are described in at least U.S. Patent Application Publications Nos. 2013/0213147 and US 2021/0197021, which are incorporated by reference in their entirety. In still other embodiments, a reflective electronic ink display may display one or more single colors/colorway patterns, while a monochromatic transparent overlay may provide design embellishments to that displayed color.

In some configurations, the display 22 may include the display element, which is physically integrated into the article and capable of outwardly displaying an image. Further, the display 22 may include any required display driving/display controlling circuitry, such as, but not limited to, a processor, a digital memory, one or more operational amplifiers, transistors, or other solid state switching devices, and/or any necessary circuitry to communicate with the onboard communications circuitry. In one embodiment, instead of relying on a traditional battery/electrochemical power storage cell to actively power the display 22, the display 22 may comprise an electronic ink display and may further include an inductively driven power supply. In such an embodiment, energy required to receive and set an image on the display may be provided to the display via a received inductive power transmission, while no additional power would be required to maintain the image once the image is set. In this configuration, use of the reflective display system may largely reduce or eliminate the need or requirement for an onboard electrochemical power cell.

Figure 6:
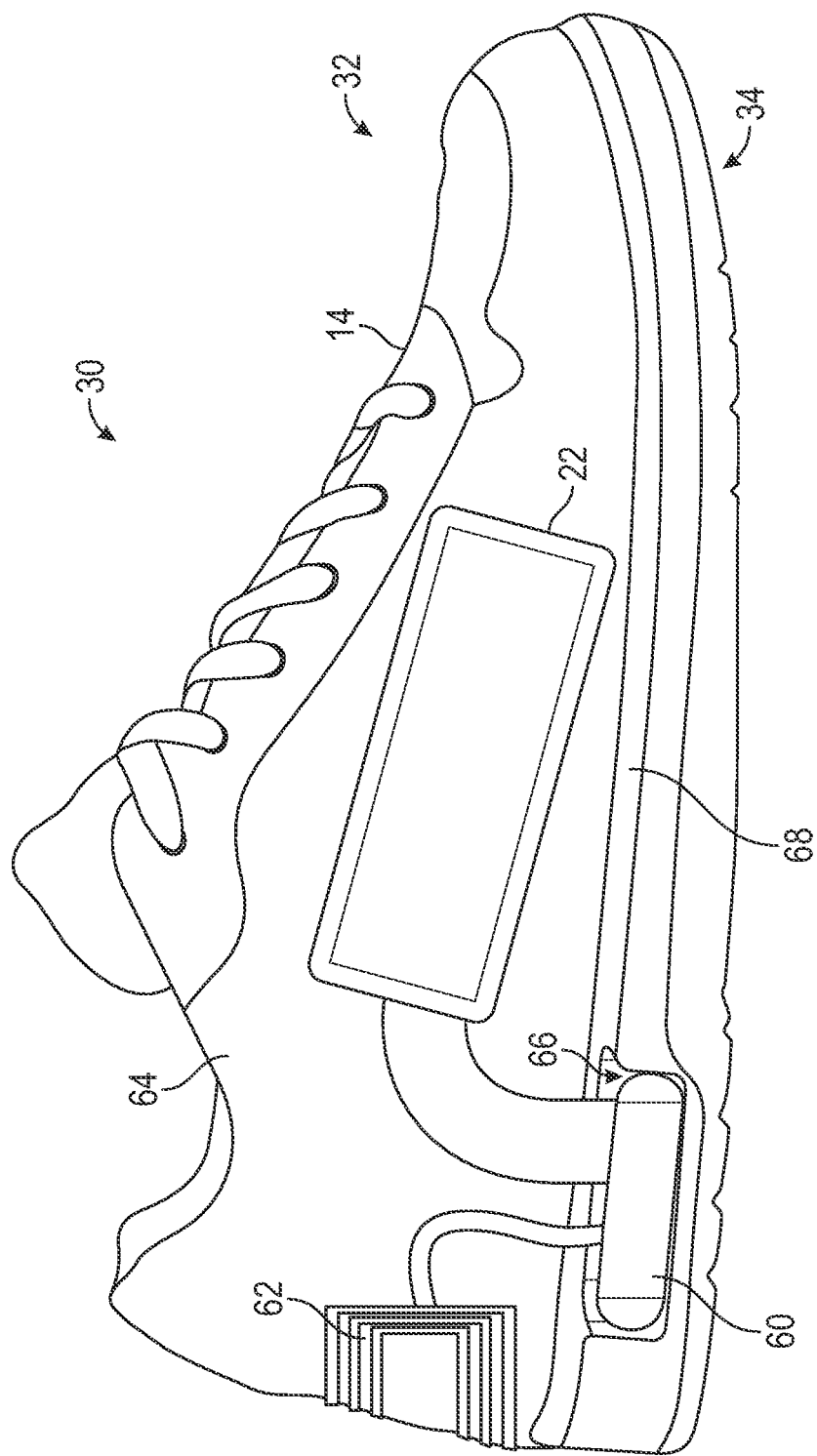
FIG. 6 is a schematic cutaway diagram of an electronics layout for an antenna, display, and processor provided on/in an article of footwear similar to any of FIGS. 1-5, with the processor being embedded or inserted within a sole structure of the article of footwear.
Figure 7:
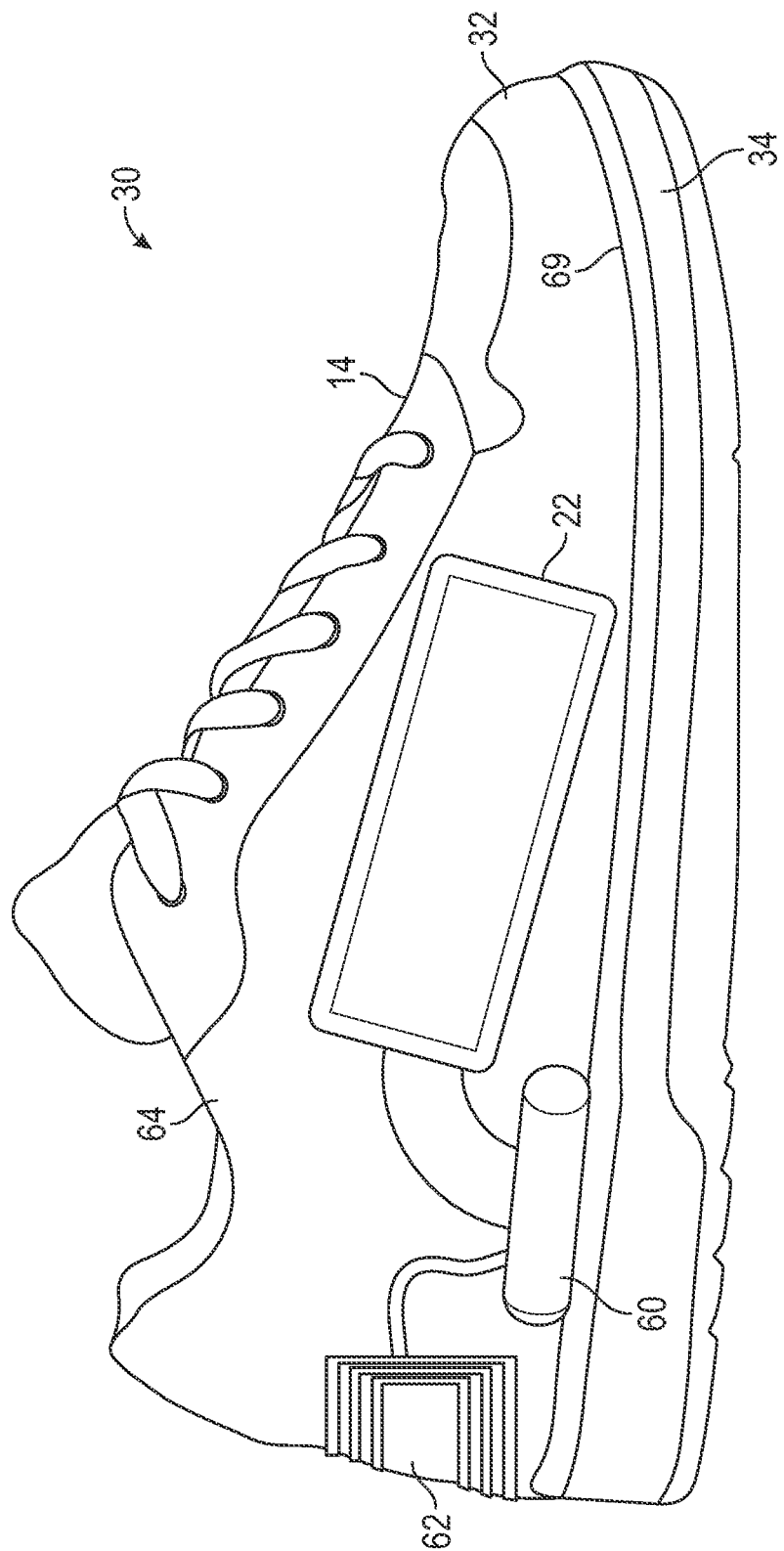
FIG. 7 is a schematic side-view diagram of an electronics layout for an antenna, display, and processor provided on/in an article of footwear similar to any of FIGS. 1-5, with the processor being external to or integrated within an upper at a location adjacent to a biteline.
Figure 8:
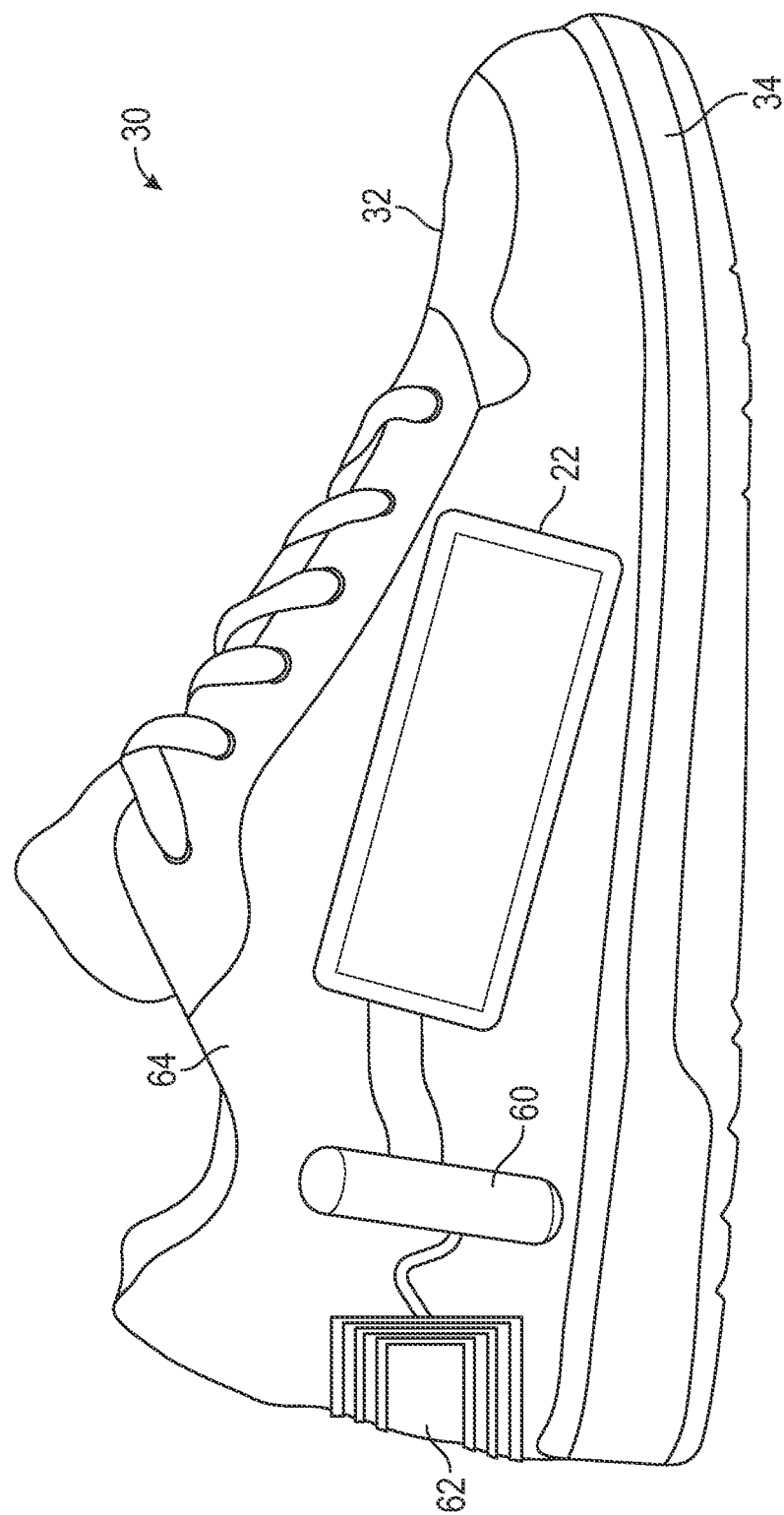
FIG. 8 is a schematic side-view diagram of an electronics layout for an antenna, display, and processor provided on/in an article of footwear similar to any of FIGS. 1-5, with the processor being external to or integrated within a sidewall of the upper.

While FIGS. 3-5 generally illustrate different styles and placements of the display 22, FIGS. 6-8 schematically illustrate different manners in which the electronic components may be packaged into a representative article of footwear 30. As generally illustrated in each of these figures, in one configuration the electronic system may include three primary components: a display 22, a controller or processor 60 and an antenna 62. While these components are all illustrated as distinct for the purpose of these schematic illustrations, in other configurations, any two or more of these components may be combined (or further divided) to yield an electronics system with more or fewer components than what is shown.

Common to each of FIGS. 6-8 is a display 22 that is either external to the upper 32, attached to the upper 32, or integrated into the construction of the upper 32. This display 22 may be similar in form, construction, and/or placement as the displays discussed with respect to FIGS. 3-5. Also common to each of the embodiments in FIGS. 6-8 is an antenna 62 placed on or integrated into an accessible outward facing surface 64 of the article (i.e., preferably on an outward facing surface of the upper 32 of the article of footwear 30 for durability purposes) The antenna 62 may be particularly configured to facilitate short-range wireless digital communication to/from the article 14. In some embodiments, the antenna 62 may further be configured to receive emitted magnetic energy in a manner that can supply an inductive charge to the onboard electronics. In one configuration, this antenna 62 may be an antenna designed to facilitate communication using a Near Field Communication (NFC) protocol. In another configuration, it may be an antenna designed to facilitate communication using a BLUETOOTH protocol.

As further illustrated in FIGS. 6-8, each embodiment includes a controller or processor 60. As more schematically illustrated in FIG. 9, the processor 60 may include a display controller 90 that digitally translates display instructions into suitable signals to control the visual display, communication circuitry 16 for local/short range wireless communications via the antenna 62, and power circuitry 92 that is operative to provide a source of electrical power to set and/or operate the display 22 and associated electronics. In some embodiments, the power circuitry 92 includes one or more inductive power transfer (IPT) circuits, that is configured to generate a supply of electrical energy via energy received from the antenna 62 or other receiving coil. In some embodiments, the power circuitry may further include one or more energy harvesting circuits, AC/DC converters, charge storage devices (batteries, capacitors, etc.), and the like. These components may be fully integrated into a single chip, a single package, or multiple discrete components in electrical communication with each other.

Referring to FIG. 6, in one configuration, the controller or processor 60 may be embedded into the sole structure 34 of the article of footwear 30, or else it may be placed with a pre-formed cavity 66 of the sole structure 34. As generally shown, in one embodiment, this cavity 66 may extend from an upper, foot-facing surface 68 of the sole structure 34, and in some embodiments, may be covered with an insole or other inlaid foam structure. Alternatively, the controller or processor 60 may be integrated within, or else bonded to the upper 32 of the sole structure 14. For example, as shown in FIG. 7, in one configuration, the processor package may be mounted adjacent to the biteline 69 of the article of footwear (i.e., the seam where the upper 32 meets the sole structure 34), or else may be mounted on or otherwise integrated more into a sidewall of the article (e.g., such as in the rear quarter area as shown). It should be understood that other packaging methods may similarly be employed in an attempt to discretely package the processing and power electronics into the wearable article.

External Computing Device

Figure 9:
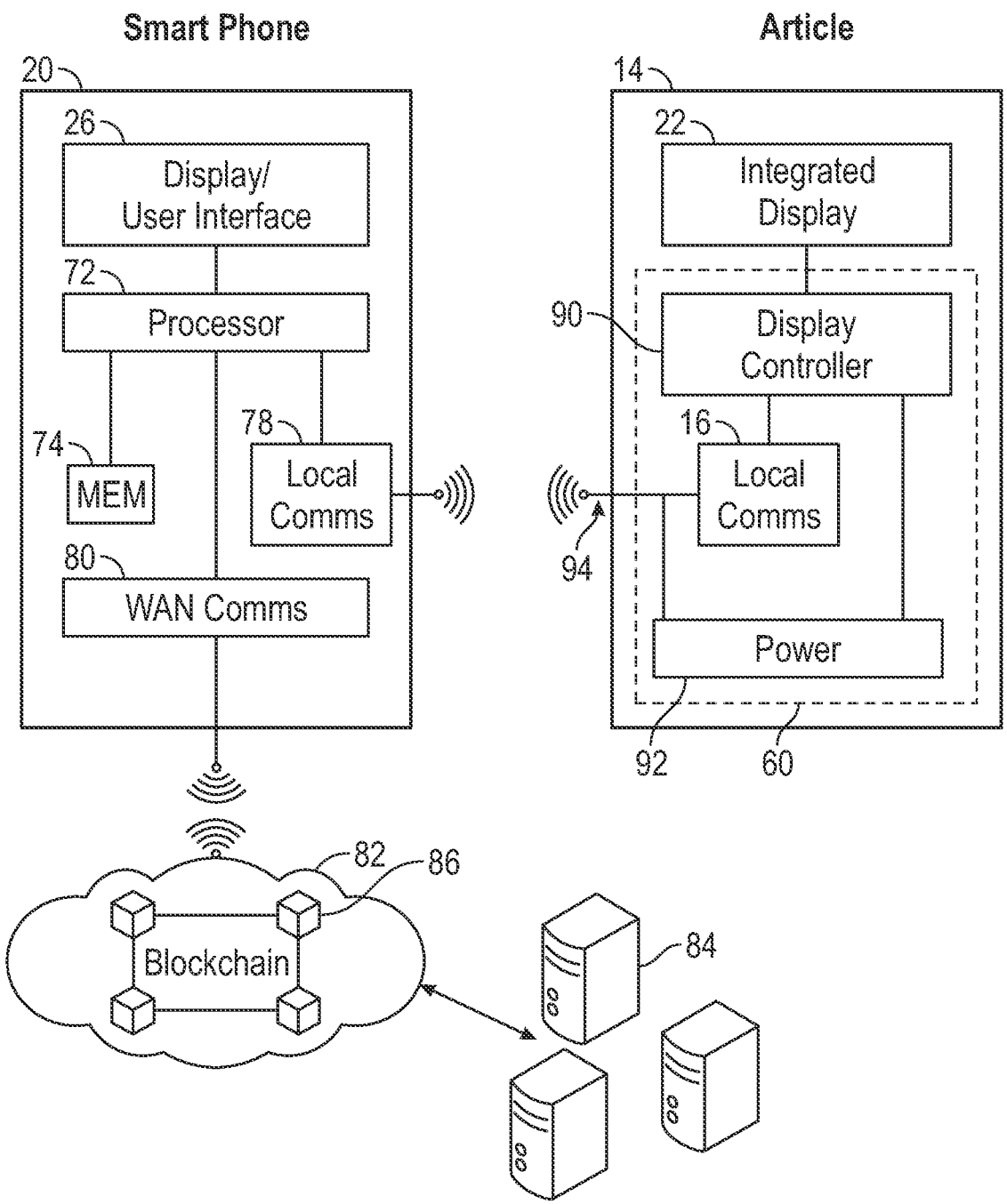
FIG. 9 is a schematic diagram of a computing device such as a smart phone in wireless digital communication with an article of footwear.

Referring again to FIG. 1, as noted above, the system 10 further includes an external computing device 20, such as a smartphone or tablet, that is operative to maintain a digital wallet (or replica thereof) and to digitally communicate with the article 14 via communications circuitry 16 integrated within the article 14 (as schematically shown in FIG. 9). As further illustrated in FIG. 9, the external computing device includes a processor 72, associated memory 74, a user interface/display 76, and communication circuitry 78 that is operative to digitally communicate with the communication circuitry 16 of the article 14. In one configuration, the communication circuitry of the smartphone and article 16, 78 may comprise compatible hardware that are operative to digitally communicate via one or more established communication protocols. In some examples, the communication circuitry 16, 78 may comprise hardware operative to implement a near field communication (NFC) protocol or a BLUETOOTH Low Energy (BLE) protocol (BLUETOOTH is a registered trademark of Bluetooth SIG, however is being used herein to refer to the protocol identified by the same name). In many examples, this communications circuitry 16, 78 is a short range communications circuitry/protocol that is configured to wirelessly communicate over comparatively small distances such as less than about 15 m, or less than about 5 m, or even less than 1 m.

With continued reference to FIG. 9, the external computing device 20 may further include wide area network (WAN) communications circuitry 80 that is operative to digitally communicate with a cloud-based, external computing network 82, such as the internet. This external computing network 82 may be in digital communication with or may otherwise include one or more external digital file repositories 84 and may implement or be connected with one or more distributed blockchain networks 86. Further, this computing network may comprise or otherwise be in communication with one or more internet-connected/cloud based computing platforms or peer-to-peer/distributed file systems such as the InterPlanetary File System (IPFS), developed by Protocol Labs. In some examples, the WAN wireless communication circuitry 80 may include, for example, a wireless radio according to IEEE 802.11x; CDMA cellular standards, GSM cellular standards; LTE cellular standards, 5G cellular standards, or the like. Said another way, in these embodiments, the external computing device 20 would have the required hardware and programming to digitally communicate with one or more internet-connected devices or file repositories over a wi-fi or cellular data connection.

While in many embodiments, the external computing device 20 that pushes the cryptographically secured digital image to the physical article 14 is a portable device, such as a smartphone, in other embodiments, the external computing device 20 may be a kiosk or terminal that may be set up at an event, or even a table-top programming device. In the event-based example, attendees at a championship sporting event may stop by a kiosk on the concourse that may apply a commemorative NFT to the wearer's article of apparel or footwear. Such a configuration may still require the user to have a smartphone with a digital wallet capable of taking ownership of the NFT, however, the process may be directed by the kiosk with the smartphone only serving to provide a wallet address the NFT may be transferred to.

Method of Use

In the simplest use case, the present system 10 may be used to bring a digital image from a blockchain network 86 or blockchain-referenced file repository 84 into the physical world by displaying it on a display 22 that is integrated into a tangible article 14. This functionality would provide an NFT owner with new avenues for displaying their cryptographically backed digital collectible in a manner for others to see. In some embodiments, to provide uniqueness and/or to prevent the same NFT from being simultaneously loaded on multiple different articles, the system may include means for registering an identifier of the article with an identifier of the NFT in a way that constrains the total number of simultaneous uses of the NFT. In one variant of this, the system may only permit an NFT to be registered or applied to a single article. In this embodiment, the NFT would need to be removed or unregistered from a first article before it could be applied or registered to a second article.

Figure 10:
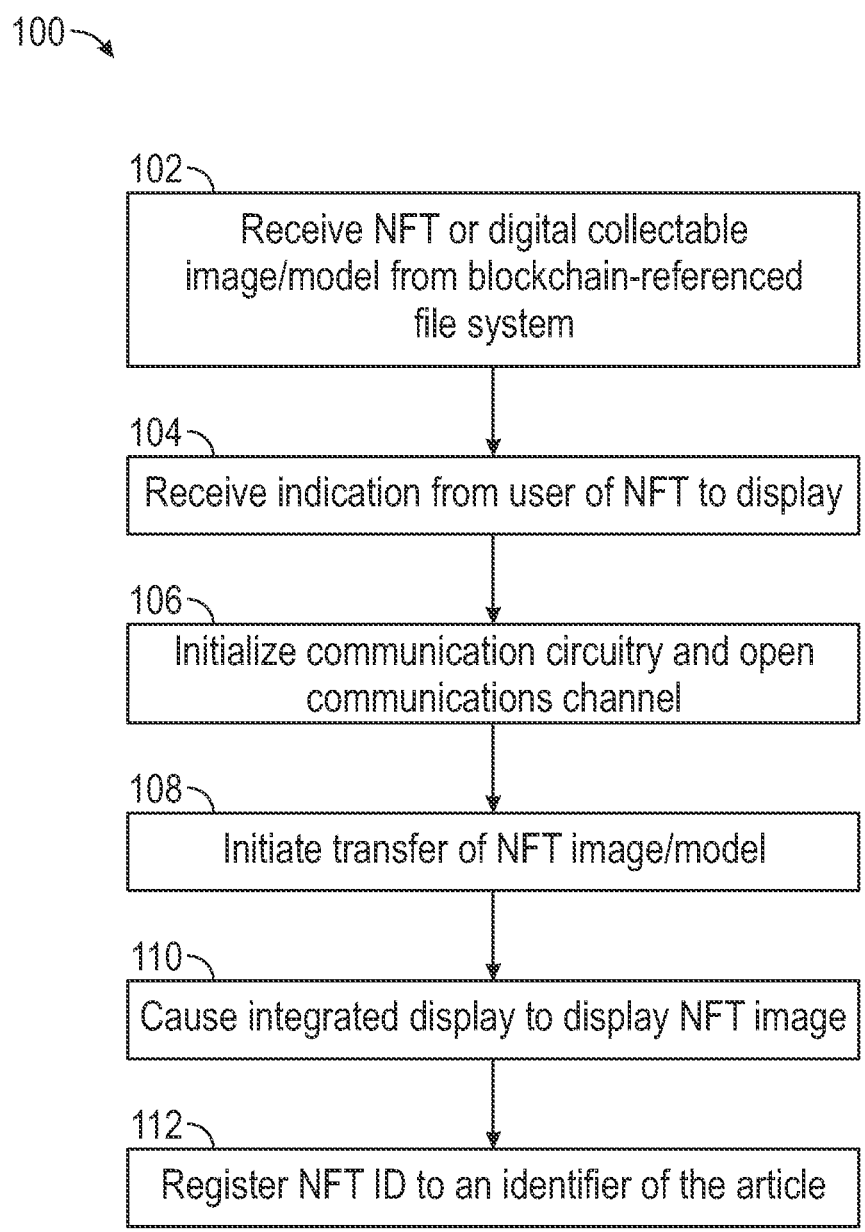
FIG. 10 is a schematic flow diagram of a method of uploading an NFT or digital collectable to a physical article.

FIG. 10 schematically illustrates a method 100 for displaying a cryptographically secured digital collectable 12 on a physical article 14 such as an article of footwear or apparel. As shown, the method 100 may begin at 102 with an external computing device receiving an NFT or digital collectable image or model from a distributed blockchain ledger or other suitable database or file system referenced by a distributed blockchain ledger, or stored on a private blockchain or file server. In one configuration, the external computing device may include software that, when executed, provides uniquely addressed digital wallet 70 functionality such as generally illustrated in FIG. 1. This digital wallet 70 functionality has the ability to maintain, or have registered thereto, one or more digital assets such as, for example, one or more digital coins, tokens, or cryptographically secured digital collectables. In one embodiment, receiving the digital image or model may include linking the cryptographically secured digital asset to the wallet 70 implemented in the external computing device 20. This linking may involve a transfer of the digital asset/token from a prior digital wallet where the asset had been registered to the wallet address associated with the device. Alternatively, it may involve simply logging in to a cloud-based hot wallet. Once the NFT is linked or otherwise registered to the external computing device 20, the computing device 20 may access a file repository (identified within the token) to retrieve a copy of the digital image or model embodied by the token. This digital image or model may then be downloaded from the identified cloud-connected file repository to the computing device.

Once the digital image or model is downloaded to the external computing device 20, the user may utilize a custom software application to select the NFT that is desired to be transferred and displayed on the article (at 104). As illustrated in FIG. 1, this may involve selecting a desired NFT image from the local wallet 70 via the software application. In some embodiments, the software may provide a visual confirmation of the selection to the user, such as by navigating to a new screen, or by identifying the selected NFT via a change in color or thickened bounding box. Following this, the software application may direct the device 20 and local communications circuitry 78 to open a communications channel with the article (at 106). In some embodiments, this may involve initializing the communications circuitry such that it can detect the proximity of the communications circuitry of the article and initialize communications once a suitable proximity is maintained. Likewise, it may involve prompting the user, via the display 76 on the device 20 to place the device against a designated spot on the article 14.

The transmission of the digital collectable to the article may be initiated by the user (at 108) either via a user-initiated software push (i.e., by receiving a user input, for example, via a touch screen interface) or automatically after bringing the computing device within a defined proximity of the physical article (i.e., as in the case of NFC communications). The computing device may then push the image to resident memory on the physical article and/or may directly activate the display on the article to display the image (at 110). Once the device 20 receives confirmation that the image transmission and display modification are complete, the device 20 may then register the NFT to an identifier of the article (at 112) or else may simply record the NFT as being "assigned," which may subsequently be used to prevent usage of a single NFT/token with multiple articles.

Figure 11:
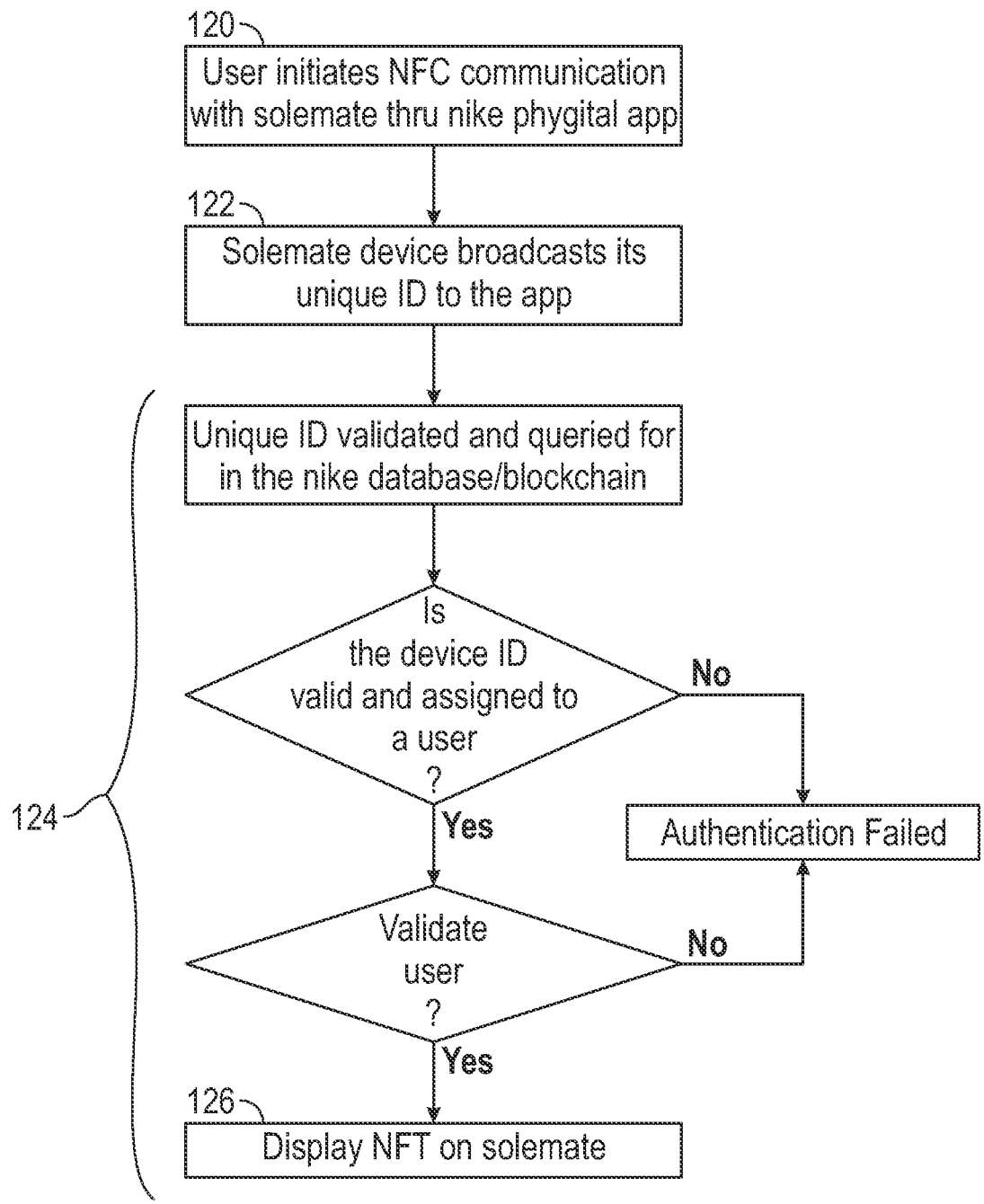
FIG. 11 is a schematic flow diagram of a method for registering or verifying a physical article prior to loading an NFT or digital collectable onto a display of the article.

As further shown in FIG. 11, in some embodiments, the NFT may be registered to the physical article to prevent duplicitous usage. In one configuration, this registration may occur by linking a unique identifier (UniqueID) of the article with the NFT. In some embodiments, the UniqueID may be a hardware encoded identifier that is provided with the communications circuitry on the physical article. Such hardware addresses/identifiers may be difficult or impossible to alter once the chip fabrication is complete. In another embodiment, the UniqueID may be an encrypted value provided in memory on the physical article and transferred to the external computing device once a communication link is established. In either instance, the UniqueID may be a value that is unique to the specific article (i.e., where multiple identical-looking articles would still each have different identifiers).

While in one configuration, the UniqueID may be a hardware identifier incorporated within the communication circuitry, in another embodiment, the UniqueID may be an identification code embedded into the article itself. For example, the unique identifier may be a unique pattern printed onto the upper (e.g., similar to a QR code) that could be read via the optical/camera functionality of the external computing device/smartphone. While such a unique pattern may take the form of a QR code, in other embodiments, it may similarly take the form of digital-style camouflage, or even graffiti-style art that is uniquely applied to the article during manufacturing or else dependent on where a particular piece of material is die cut from a larger patterned bolt. In this embodiment, pre-defined pixels or locations within a designated area of the article may be extracted as the code, with there being uniqueness of the coloration of these points from article to article. In still other embodiments, magnetic particles may be embedded within the foamed sole structure and the magnetic signature of the sole may be scanned by a dedicated device, or even by a magnetometer incorporated into the external computing device/smartphone. By relying on secondary sensing means (e.g., camera or magnetometer) that is separate from the communications circuitry, it may be possible to build the UniqueID in a multi-factor manner where the UniqueID may be a resultant combination of one or more identifiers that are unique to the article. Further examples of secondary sensing means are detailed in U.S. Patent Application No. 2021/0174377, which is incorporated by reference in its entirety and for all that it discloses.

With continued reference to FIG. 11, in one embodiment, prior to any display modifications, the user may be prompted to register the physical article with a software application running on the external computing device. In such an embodiment, the registration process may involve establishing digital communications between the external computing device and the article (at 120), receiving the UniqueID from the article (at 122), and in some embodiments, the device 20 may transmit an authenticity verification request to a third-party or internet-connected server to determine if the UniqueID is valid (at 124). This validity check may involve comparing the UniqueID to a catalog of UniqueIDs that were recorded during production, cross-referencing attributes encoded in the UniqueID with user-reported or image-detected attributes of the article, and/or by cross-referencing the UniqueID with previously registered UniqueIDs from the platform.

If the UniqueID is valid for that make/model/colorway of an article, then in some embodiments the software application may permit the user to register that particular article to the user's verified user account/identity. In doing so, a chain of title and accurate ownership records may be maintained so that future purchasers may know that they are buying an authentic article as well as one that has not been stolen. If the UniqueID is valid and assigned to a user's account/virtual locker, then the system may proceed to displaying the NFT on the article (at 126). In this manner the software application may only permit the display of an NFT on the article if the article is authentic and has a clean (or potentially rehabilitated) chain of title.

Once the NFT is displayed, as noted above, the NFT may be registered to the article or else designated as being in a "displayed" state to prevent simultaneous usage. The process of registering the article-based UniqueID and the NFT may occur in a variety of different ways. In one embodiment, an internet connected server may maintain a collective database or ledger of all UniqueIDs that is further annotated by any NFT identifiers that may be presently applied. This database or ledger may be useful in both validating or authenticating the physical article as well as determining whether an NFT that is sought to be applied is already applied to a different article. This database or ledger may be maintained on a private server, may be distributed across a plurality of servers, and/or may be cryptographically recorded to a blockchain ledger. Ultimately this ledger may be useful in being queried by the external computing device, and it may be annotated/appended whenever an NFT is newly applied/removed to an article.

In another embodiment, the article may be tokenized and represented by a first NFT (i.e., a digital certificate of authenticity), while the overlayed image may be embodied as a second NFT. In this embodiment, the two NFT's may be cross-referenced either internally (i.e., within the metadata of one or both of the respective NFTs), or else may be externally cross-referenced, such as by using a separate database, ledger, or recordation process.

In view of the foregoing, as it specifically pertains to article authenticity, in a first embodiment, there may be no article registration at all. Said another way, any NFT image may be pushed out to the article so long as the article has a suitable display. In a second embodiment, the software application may first attempt to determine the authenticity and/or identity of the article prior to transmitting the image. In this embodiment, upon indicating the desire to apply the NFT to the article, the software application may receive a UniqueID from the article with this UniqueID, the software application may then either self-verify the UniqueID as authentic or authenticate via a compiled list or service. Self-authentication may occur, for example, by passing the UniqueID through a decrypting or decoding function/transform which may output an indication of authenticity (e.g., via detected patterns or encoded identifiers within the UniqueID). If relying on a compiled list or service, the UniqueID of each authentic article may be recorded and cataloged at the time of production. The authenticity check may then include the software-application either directly examining this catalog to determine if the UniqueID had been previously recorded, or else making a digital request to a third-party service that maintains the catalog to determine if the received UniqueID from the article matches a previously cataloged UniqueID (further details of such a service is described in greater detail in US 2021/0174377).

While displaying an NFT on the article provides the user with another avenue to display their NFT in real life, the present technology further enables the NFT to be enhanced by recording the NFT's own journey through time. To this end, once the NFT is applied to the article, the software application may transmit an instruction to record the usage to the NFT (i.e., either directly to the metadata of the NFT, or to a linked public or private sidechain). Such a recordation may include writing an indication of the article (e.g., UniqueID, make, model, year, colorway, etc) and/or user to the NFT or sidechain referenced by the NFT. Likewise, while the NFT is applied, the software application may catalog events that the NFT may have been a part of, and an indication of such events may be either periodically written to the chain or may be written once the NFT is removed. In a shoe context, examples of such events may include an indication of games played while wearing the NFT equipped shoe, tournaments participated in while wearing the NFT equipped shoe, races run while wearing the NFT equipped shoe, steps taken while wearing the NFT equipped shoe, etc. The software application may determine these events through, for example, direct communication with the shoe/article, direct user input, and/or integration with third-party services such as geolocation services, race management applications, event/tournament hosting data repositories, social media services, and the like. In this manner, downstream owners of the NFT may know that the NFT was worn/displayed during a particular professional sporting event by a star athlete (e.g., was worn during the championship game by the MVP).

In some embodiments, the software application, in tandem with the display 22, may log events that are pre-planned or are characterized by the completion of a quest. For example, via a centralized server in communication with the external computing device 20, a treasure hunt, quest, mission, race, or scavenger hunt (generically a "task") may be planned and broadcast to participants via their device and resident software application. Upon completion of the task, the user may receive an award or virtual character (i.e., that the user found or "caught"). This character may then be transmitted to the display 22 so that others can share in the excitement and joy. The "event" of completing the task may then be logged to the NFT in the manner described above. In some embodiments, the article of footwear may further participate in the task (in tandem with the user device) by giving the user one or more haptic queues as navigation guidance during a search or race. Such functionality is further explained in US Patent Application No. 2023/0270198, which is incorporated by reference in its entirety and for all that it discloses.

While the examples above detail the display of a specific NFT onto a display integrated on the article, in other embodiments, the NFT may instead comprise a more generic image that, when applied to the article, results in an applied image that is different than that of the NFT itself. For example, the NFT image may be a generic image such as a test tube vial, a gem, a loot box, or other such image. Upon application of the NFT to the article, such as described above, a more artistic design, colorway, autograph, or image may be applied to the display integrated into the article. In some embodiments, this applied image may be an image that is selected from a collection of images, for example, according to a random draw or probabilistic model. FIG. 12 schematically illustrates an embodiment where an outcome-uncertain NFT is applied to a physical article and subsequently one of a plurality of colorways (e.g., colorways 120A, 120B, 120C, 120D, 120E, or 120F) may be subsequently applied to the shoe. In some embodiments, alteration of a colorway, at least in a binary sense, may be accomplished via spray-on e-inks.

Figure 13:
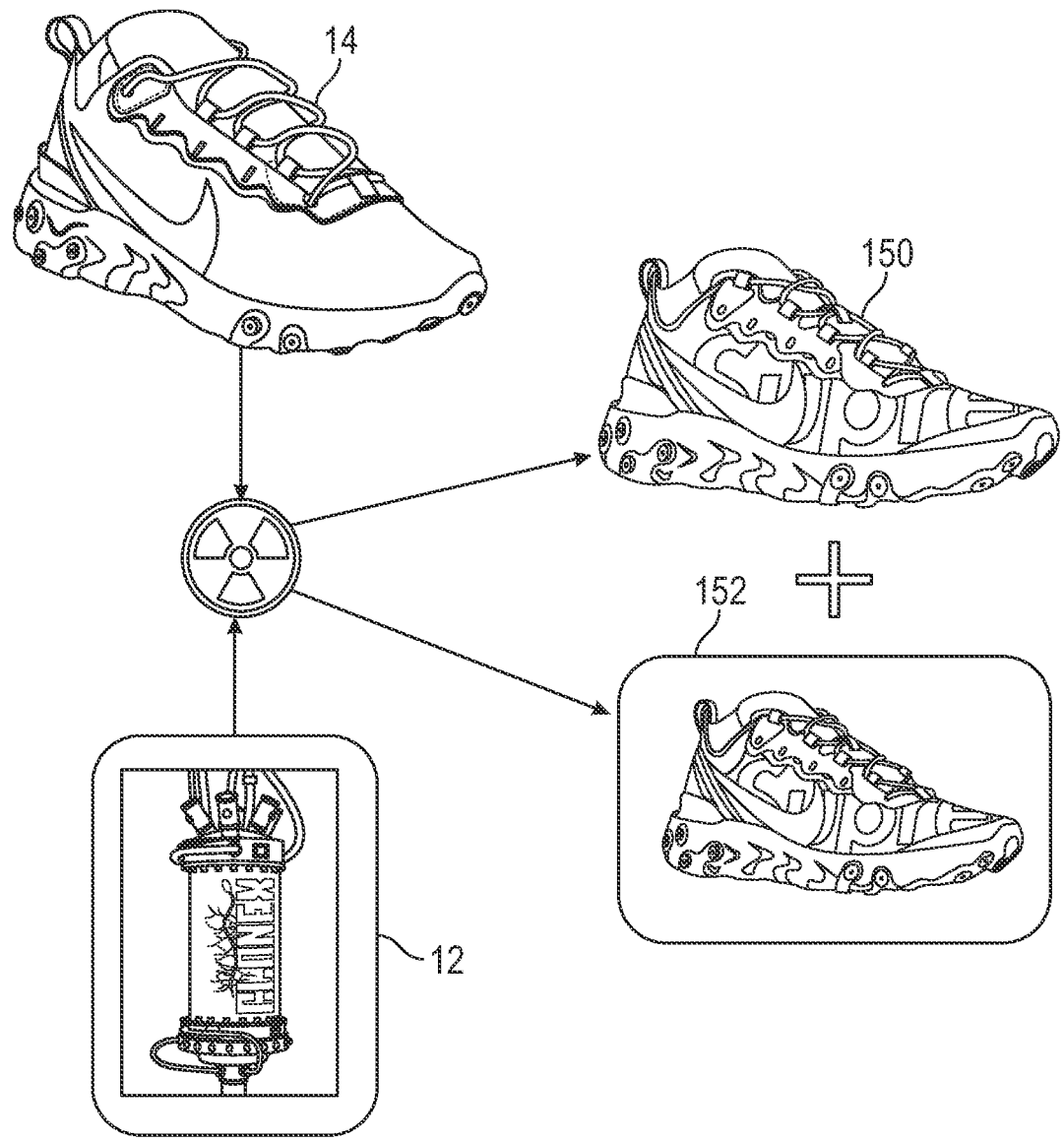
FIG. 13 is a schematic diagram of a method of creating a digital twin NFT having an image or model that resembles a physical article that has been augmented by an applied NFT.

Referring to FIG. 13 in some embodiments, an NFT 12 may be applied to a physical article 14 such that the physical article displays an associated image via an integrated display (i.e., augmented physical article 150). In some embodiments, this action of applying the NFT 12 to the physical article 14 may also provide the user with the option to generate a digital twin collectable 152. This digital twin collectable 152 may be a newly minted NFT or digital collectable that is a copy of, or at least stylistically resembles the physical article as augmented by the applied NFT 150.

Creation of the digital twin NFT 152 may first require the system to identify one or more characteristics of the physical article 14. In some embodiments, these characteristics may be encoded within the article's UniqueID, or else may be transmitted along with the UniqueID to the external computing device 20 when the NFT is applied. In other embodiments, the external computing device may receive the UniqueID and then query a database (e.g. the database that may be used to facilitate the registration of the article and the NFT), which may maintain a full collection of design parameters for that article. These design parameters may be registered to the UniqueID within the database at the time of manufacture. Alternatively, this database may simply maintain a virtual image or 3D model of the article, or else may reference or include a stock silhouette image/model according to an associated model number or SKU of the physical article. The NFT image may then be overlaid and/or merged into the digital reconstruction or digital model of the physical article, and this combined model/image may be minted as a new token/digital collectable.

Figure 14:
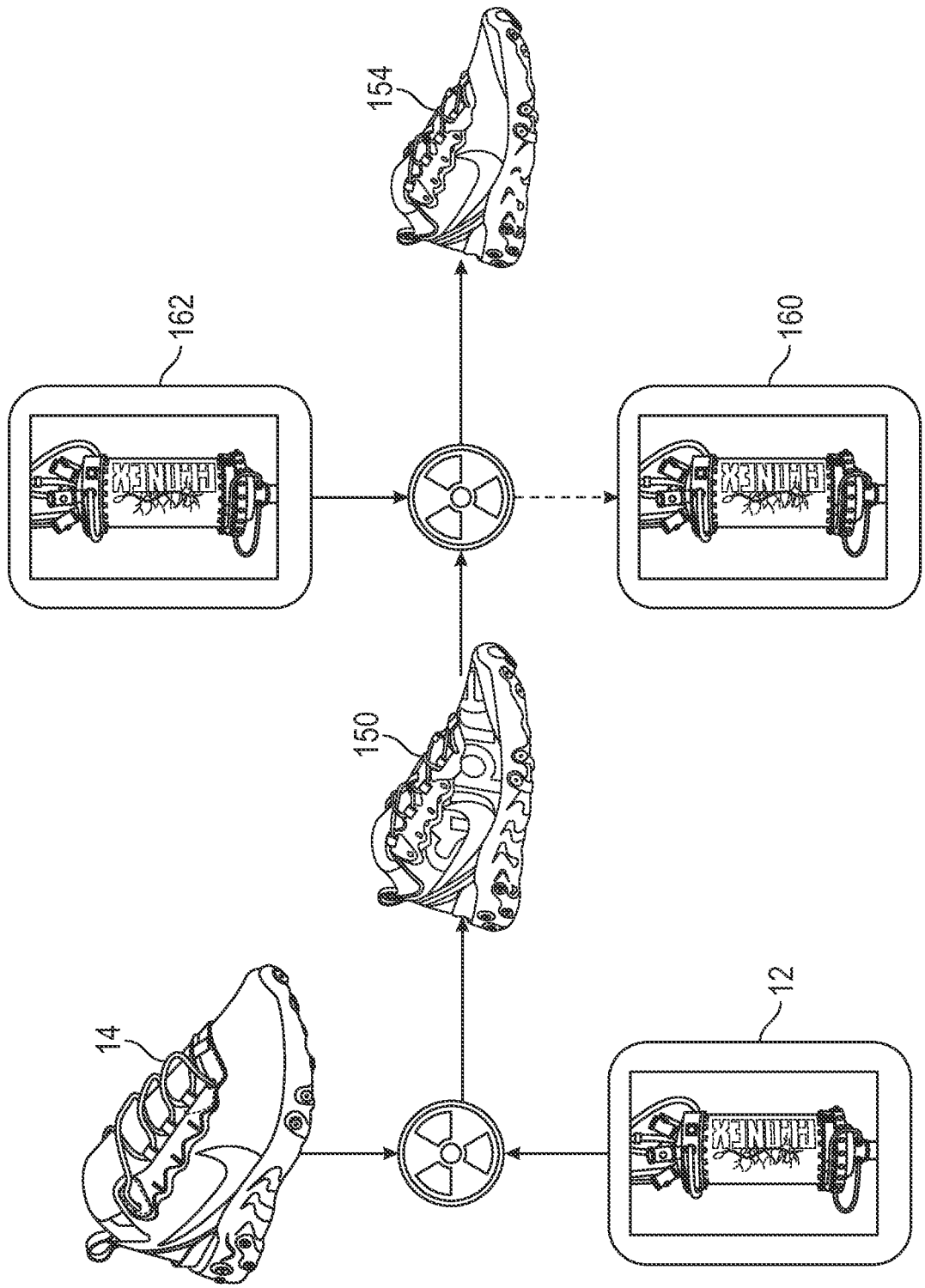
FIG. 14 is a schematic diagram of a method of removing an NFT from a physical article prior to re-skinning the article with a second NFT.

Referring to FIG. 14, in one embodiment, removal of the probabilistic NFT (e.g., colorway theme NFT) from the physical article may result in the original NFT either being unlocked or unapplied within the externally connected database, or else the NFT may be re-minted as a new single-use NFT. In either instance, the external computing device may make a request to deregister the NFT from the UniqueID, and once confirmed, the user may be prompted to initiate the removal of the NFT from the physical article display much in the same way that it was applied.

In some embodiments, such as shown in FIG. 3 where the display 22 may coincide with the silhouette or outer periphery of at least a portion of a logo 54, the brand owner may desire some degree of content control to prevent overt disparagement of the logo or general tradedress of the article. Such content control may serve to prevent NFTs containing obscene or derogatory content, from being applied to the article. To provide this content control, in one configuration the software application running on the external device 20 may include an adaptive content filter that may examine the NFT image before it is transmitted to the article. Such an adaptive content filter may include a machine learning algorithm that is trained to recognize and digitally flag prohibited content. Once the content is flagged, the software application may prohibit the flagged NFT from being transferred and/or displayed on the article. In some embodiments, once an NFT has been evaluated for prohibited content, the software application (or a similar $3^{rd}$ party service) may provide the NFT with a designation of being verified. In some embodiments, this designation may be recorded to the blockchain, however, in other embodiments, it may simply be held in an off-chain database.

Figure 15:
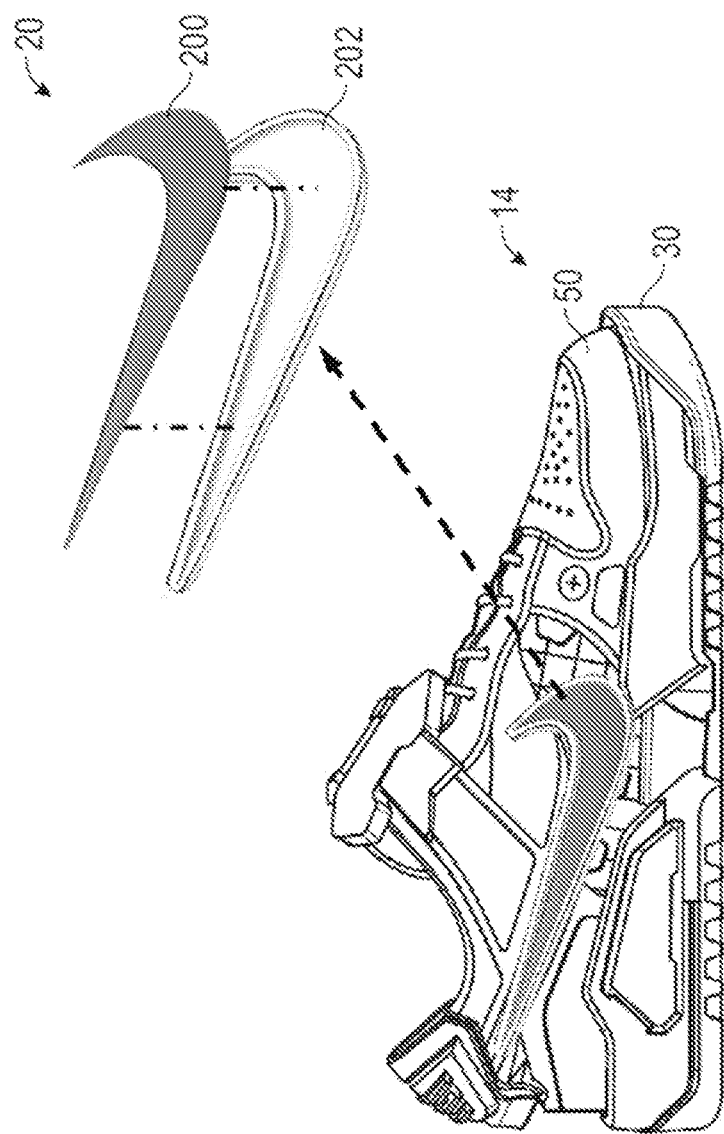
FIG. 15 is a schematic exploded view of an article of footwear with a removable display that nests into a receiver.

While the above-described technology generally builds or integrates the display-tech into an outer surface of the article 14, in other embodiments, the display 22 and on-board control circuitry 16 may be built into a stand-alone device that may be affixed to the article 14, such as generally illustrated in FIG. 15. For example, in one embodiment, the display 22, communications circuitry 16, and any associated power supplies, power circuitry, or processing capabilities may be integrated into a lace-lock component that includes at least one aperture for receiving a shoelace 40 therethrough. The lace-lock display may generally include an outward facing electronic ink display, local communication circuitry, and a power source/supply. In action, this lace-lock display may operate in a similar manner as described above with respect to at least FIGS. 1 and 9-11.

With more specific reference to FIG. 15, in one embodiment, the article of footwear 30 may include a means for selectively receiving a removable display device 200 such that the display device 200 is held in a semi permanent, substantially fixed physical arrangement relative to an outer surface 50 of the article 30. As shown, in one embodiment, the article 30 may include a receptacle 202 that is sized to receive the removable display device 200 in a substantially nested arrangement. In other embodiments, the removable display device 200 may mount directly to the article 30. In either case, the display device may be selectively attached to the article, for example, through the use of one or more clips, bendable prongs, elastic bands, magnets, snaps, hook and loop fasteners, zippers, posts, ace bandage clips, slides, spring clips, detents, cords, buttons, rivets, screws, pins, re-usable adhesive, bendable wires, suction cups, slide rails, twist-lock fittings, quarter turn locks, Christmas tree fittings, barbed fittings, or the like. In some embodiments, the removable attachment means may include posts, quick connect fittings, or other such connectors such as described in U.S. Pat. No. 8,782,814, which is incorporated by reference in its entirety. Similar to the display 22 discussed above, the removable display device 200 may include an outward facing display, a display controller, communication circuitry, and any required power supply and/or communication antenna. In as a primary difference from the display 22 discussed above, some or all of the removable display device 200 may be selectively removable from the article 14.

In one embodiment, a plurality of display devices 200 and/or non-display elements may be stackable to provide for different visual effects. As noted above, display devices 200 may include emissive or reflective display technology, and the display 200 may also include one or more sections that are transparent or semi transparent (fully or selectively) to permit displayed features from more inwardly stacked layers to be visible or selectively visible to an adjacent observer. As used herein, non-display elements may include features such as stencils, cutouts, or other embellishments that no not include a controllable display.

In some embodiments, the display 22 (or collection of permanent and/or removable display device 200) may utilize a layered construction with both emissive and non-emissive elements to enable selective transparency and visual effects. For example, the display 22 may comprise a bottom layer formed from a reflective electronic ink display, and a top layer formed from a transparent or semi-transparent OLED display. The bottom electronic ink layer may be used to provide a static backdrop image or color, while the top OLED layer may be used to overlay dynamic visual effects. The transparent or semi-transparent nature of the top OLED display layer allows at least a portion of the electronic ink display below to be partially visible. For example, the transparent OLED layer can be activated to display sparkling animated effects against a solid color background shown on the electronic ink display. Alternatively, the transparent OLED layer could display grayscale imagery, like a team logo, on top of a color image shown on the lower layer.

In another implementation, the stack could comprise a bottom transparent OLED layer optimized for color effects, and a top monochrome OLED layer for overlays. Yet another configuration could involve a bottom electronic ink segment, a mid OLED layer, and a top segmented electronic ink layer for further versatility. The display controller 90 may selectively activate either display layer individually, or blend content across layers. When the user interacts with the shoes, such as tapping the heel, the controller 90 could activate the transparent OLED layer for 30 seconds to show a dynamic color effect. This layered construction with transparent and opaque elements enables unique visual capabilities. The controller 90 can drive the disparate layers in a coordinated manner to produce integrated visual content and effects while optimizing power efficiency. If using a layered configuration, each layered display may be a stand-alone device, or may operate in tandem with other layers to avoid the need for redundant circuitry.

Figure 16A:
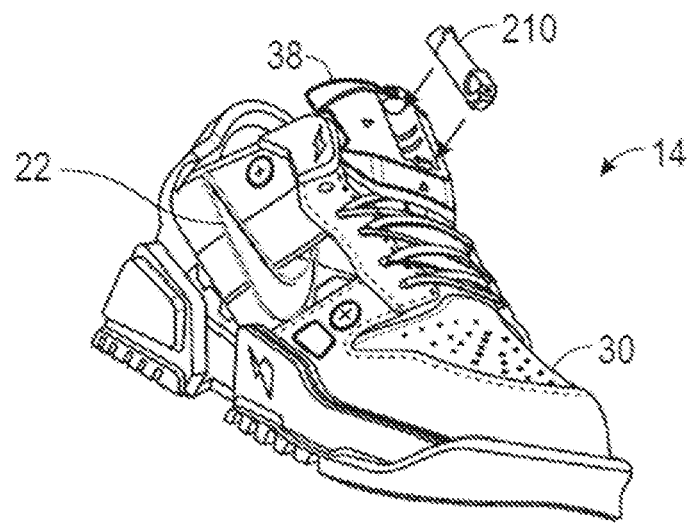
FIG. 16A is a schematic perspective view of an article of footwear with an ancillary component being inserted into a receiving cavity in the tongue.
Figure 16B:
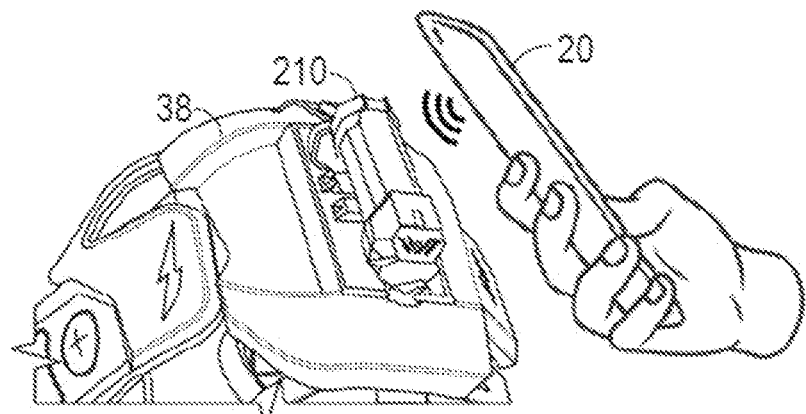
FIG. 16B is a schematic perspective view of a user wirelessly communicating with the ancillary component of FIG. 16A.
Figure 16C:
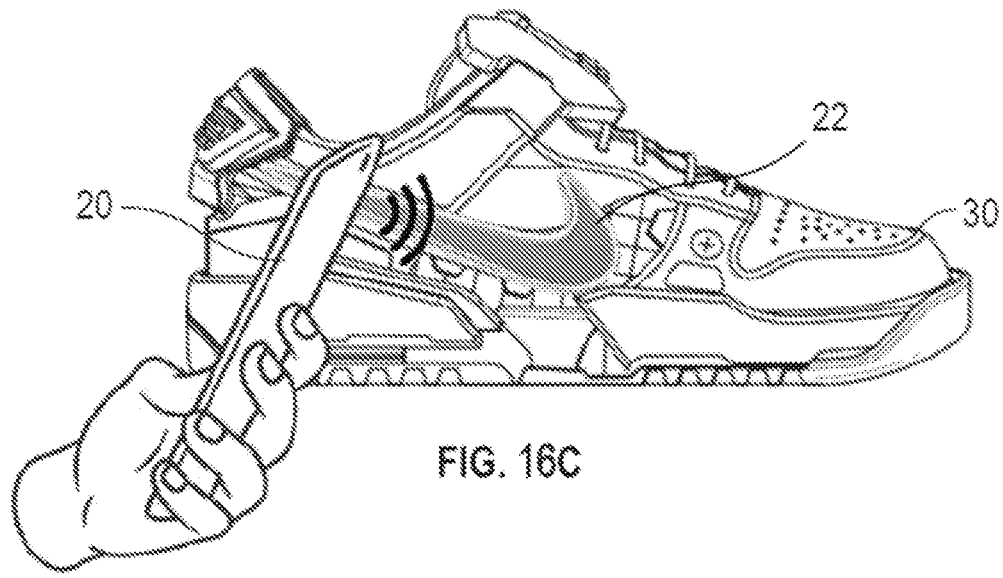
FIG. 16C is a schematic side view of a user wirelessly communicating with a display on the article of footwear of FIGS. 16A and 16B following communication with the ancillary component as shown in FIG. 16B.

As generally illustrated in FIGS. 16A-16C, in one embodiment, one or more aspects of the display 22 (used generically to be inclusive of removable displays 200) may be controllable based on a code, identifier, or attribute of an ancillary component 210 that is integrated or attached to the article 14 apart from the display 22. For example, in one embodiment, the color or set of available images that may be displayed on the display 22 may be determined or unlocked according to a code or identifier that is embedded into a vial 210 that may be removably attached to the tongue 38 of the shoe 30. This code or identifier may be read, for example, via a wireless communications protocol, such as an NFC or BLUETOOTH protocol. For example, the vial 210 may include circuitry or memory that includes a code stored therein. A user may read this code, for example, via a user device 20 that is brought into a close spatial relationship with an antenna that is in wired communication with the circuitry or memory of the vial (ancillary component 210). In one embodiment, this antenna may be a part of the vial, however, in another embodiment, the antenna may be integrated into the article 30 and in wired communication with a receptacle adapted to receive the vial. In this later embodiment, insertion of the vial into the receptacle would be required to facilitate the communications with the vial to obtain the code. In some embodiments, the vial 210 may include a battery that may power the display, such to provide a visual effect such as a sparkle on an OLED emissive screen when a foot strike is sensed.

Once the code is read from the ancillary component 210, the user device 20 may then establish a communication link with the display 22 in the manner described above, though the total set of available colors, images, digital collectables, or NFTs may be dictated, limited, or otherwise made available on the basis of the received code. As a practical example, a vial of a first type may include a first code that enables the display 22 (via programming by the user device 20) to output or display a first color or first image. A vial of a second type may include a second code that enables the display 22 (via programming by the user device 20) to output or display a second color or second image. In each instance, the user may be required to scan or communicate with the vial to first receive the code, which then may unlock or otherwise instruct the user device 20 on which color or image to make available to the display 22.

While a consistent focus throughout this disclosure is on the use of the present display with digital collectables, and in particular, NFTs, the digital collectables displayed on the shoe are not limited to only NFTs. Instead, images, characters, and accomplishments from video games or other social media or software applications could also be displayed. Referring to FIG. 17, in an embodiment, the image that is displayed via the display 22 may received from a user account 232 that is resident on a game server 234 that is in communication with the user device 20 via a cloud computing network 82 (e.g., the internet4. In this manner, the digital collectable need not be an NFT, but instead may be an in-game accomplishment, trophy, rank, level, user avatar, graphically designed user banner, and/or game-related branding. In some embodiments, the user device 20 or game server 234 may modify a base image 236 that is native to the game server or video game environment so that it may be more easily displayed on the display 22.

Digital Application/User Interface

The digital application running on the user's device is central to the process of displaying a digital collectable on an article. More specifically, it is used to fetch the available images, catalog them, and initiate the transfer. In one embodiment, the digital application may be a digital wallet application running on the external computing device 20 (such as a smartphone). The digital wallet app may include resident software and algorithms that may reside on the external computing device and may configure the device to achieve the functionality as described herein.

Prior to commanding the display, the digital wallet app may connect to one or more distributed blockchain ledgers and/or internet-connected digital collectable repositories to receive available collectables associated with the user. For example, the digital wallet app may connect to public blockchain networks like Ethereum or Polygon to obtain non-fungible tokens (NFTs) that represent unique digital collectables. The digital wallet app may also connect to InterPlanetary File System (IPFS) nodes or other file repositories that contain collectable image files referenced by on-chain NFT metadata.

To access the collectables, the user may first need to connect their digital wallet app to the relevant blockchain networks and services. In some instances, the digital wallet app may require the user to set up an account and provide authentication credentials such as a seed phrase. Once authenticated, the digital wallet app can observe and interact with the blockchain networks to obtain NFTs and their associated metadata and media files.

In some embodiments, the digital wallet app may be configured to scan the connected blockchain networks and index any NFTs that have been minted or transferred to wallet addresses owned by the user. The digital wallet app may then extracts the metadata from each identified NFT and use this to retrieve the associated collectable files from IPFS. These files may then be stored locally on memory of the external computing device 20 so they can be quickly accessed when needed.

Additional steps may be required to decrypt or authenticate the files depending on the NFT standards being used. For example, if an NFT uses encrypted IPFS Content Identifiers (CID), the digital wallet app may need the user's private key to decrypt the CID and access the file. Some NFTs may also contain integrity checks that require verifying a cryptographic signature on the file.

Once the collectable files are obtained and authenticated, they may be stored within a local digital wallet maintained by the digital wallet app on the device. Within this local wallet, the collectables may be organized and indexed so they can be easily browsed and accessed by the user when selecting which one to display. Encryption or other security measures may further be used to protect the stored collectables.

When the user desires to display a specific collectable on the article, the user may open and access the digital wallet app on the external device 20. The digital wallet app may provide an intuitive user interface, via the display 26, that allows the user to browse through the collectables stored in the local wallet.

In some embodiments, the app may display small thumbnail previews of each collectable image to allow quick visual scanning. Collectables may further be organized into galleries or collections to simplify browsing. A search or filtering system may be provided to help users quickly locate a specific collectable among potentially thousands in their wallet. Filters may allow searching by properties like color, rarity, mint date, issuing brand/collection, etc.

Once the user locates the desired collectable, the user may select it by tapping on the thumbnail or using another selection mechanism. The digital wallet app may then indicate the currently selected collectable via a visual indicator like a highlighted border or checkbox. With the collectable selected, the user can then initiate the process of displaying the collectable on the article.

In some embodiments, the digital wallet app may include additional user interface features may allow the user to perform edits to the selected collectable image before displaying it. For example, the app may provide cropping tools to remove unwanted portions of the image. Scaling and positioning tools may help the user conform the collectable to the display size and layout. Color editing functions could enable converting a color image to black & white or otherwise altering its colors. The app may also allow selecting a specific frame from an animated collectable or choosing the viewing angle for 3D collectable models. Any edits are non-destructively applied to a separate copy of the collectable image file, preserving the original.

After any optional edits are complete, the digital wallet app/external device can proceed to connect to the article and transmit the collectable for display. The selected collectable image, whether original or edited, is passed to the transmission functionality when initiating the connection.

Once a collectable is selected in the digital wallet, the digital wallet app can initiate communication between the external device and the article's communication circuitry. If using an NFC protocol, this short-range wireless communication may be enabled by bringing the external device in close physical proximity to the article, such as by touching the device against the side of the shoe containing the antenna such as may be required if using a near field communication (NFC) protocol. If using a Bluetooth protocol, the device may be configured to pair and/or connect to the article.

In some embodiments, the external device and article may establish encrypted transport keys for a secure communication session. Commands and data transmitted during the session may then be encrypted by the originating device and decrypted by the receiving device. If authentication is needed, keys may be derived from unique identifiers exchanged during initialization.

Optionally, the digital wallet app on the external device may provide a confirmation or activation step before proceeding to transmit the collectable image. This user interface flow helps prevent accidental or undesired activation. Examples include requiring the user to tap a button on the device screen, or physically press a button on the device or article itself after the NFC connection is established. User confirmation provides intention before taking the action.

Once the user provides confirmation through the digital wallet app, the app can begin transmitting the selected collectable over the connection to the article. The image data may be encrypted and sent wirelessly through the coupled antenna coils in packets, along with any display configuration instructions. The article's communication system receives the potentially encrypted packets, decrypts them using the established secure session keys, and extracts the collectable image data and instructions. This information is passed to the integrated display controller to render the collectable visually on the display.

In some embodiments, the display controller processes the collectable image to map it to the physical display pixels. Any display configuration instructions are also applied, such as scaling and positioning the image to fit the display area. The display controller drives the electronic ink, OLED, or other display technology integrated in the article to reproduce the collectable image.

Optionally, the digital wallet app may also request and receive a unique identifier for the specific article during the communication session. The article identifier may then be transmitted to the external device/digital wallet app, and in some embodiments, the digital wallet app may use this identifier to verify the specific article as authentic before transmitting the collectable image. Verification may involve comparing the identifier to a catalog of known authentic identifiers. If the article is successfully verified, the digital wallet app may also register the association between the collectable and the article's UniqueID. This registration may help prevent duplicative display of the same collectable on multiple articles. The registration could be recorded in an external database, on the blockchain ledger, or in the collectable's metadata.

After transmission is complete, the communication session between the device and article may be closed. The collectable image persistently displays on the integrated display and the user can now admire their digitally rendered collectable and bask in the joy that such a display on their physical article brings.

In some embodiments, as the collectable is displayed on the article, the digital wallet app running on the external device may passively track usage events and append associated metadata to the collectable records. Examples may include the date, time, and location where the collectable was displayed. If granted permission, the app may access device sensors or user input to record specifics like heart rate, step count, or user notes while wearing the article.

In some embodiments, the digital wallet app may also infer usage events based on other factors. Integrations with social media apps could detect photos where the user is wearing the article with the collectable shown. Check-ins at certain locations like major sports stadiums could imply the collectable was displayed during a significant event.

As these usage events are detected, the digital wallet app may accumulate this metadata locally. Periodically, or else when explicitly requested by the user, the updated metadata can be appended to records associated with the specific collectable. In some embodiments, this additional metadata may be appended to the collectable's core records in an immutable fashion by writing to the blockchain ledger where the collectable NFT is registered. For example, the app could publish transactions to Ethereum storing the new metadata associated with that NFT's token ID. Alternatively, the metadata can be stored off-chain in a sidechain or IPFS and referenced from the main collectable record on the blockchain. This avoids blockchain storage costs for large amounts of data.

Regardless of storage method, accumulating this usage metadata enhances the history and storytelling capabilities of the collectable. Future owners can verify and appreciate its display in notable places and situations, increasing collectability and value.

In an embodiment where a video game derived image is used/displayed as a digital collectable, the user may begin by link their gaming profiles or accounts to their digital wallet app. The wallet can then index the user's current status and achievements within each game. Instead of NFTs, these would simply be digital images queryable from each game's servers. In some embodiments, the user could browse their player profiles to select a specific avatar, badge, trophy, or other image unlocked within a game to display on their shoe. For example, they may select their customized character to display. Alternatively, they could display the trophy image awarded for winning a tournament.

When the user selects the game-derived image in the wallet app, a request may be sent via an API to the corresponding game server. This request may retrieve the latest user data to dynamically generate the desired image, such as rendering the 3D avatar or overlaying the trophy on a background template. The generated image file is returned to the digital wallet app, which can then proceed with transmitting the image to the shoe's display via the communication link as described above.

Each game integration in the digital wallet app may provide the required APIs and endpoints for requesting the user-specific images on demand. The images could also be automatically updated by the wallet app if the user earns new achievements or customizes their avatar. In this manner, the user can proudly display their gaming accomplishments and digital identities by rendering them from the digital environments onto physical real-world items. The shoe display becomes an extension of their virtual selves.

Aspects of this disclosure may be implemented, for example, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of non-transitory memory devices in digital communication with the controller. Non-transitory memory may include, for example and without limitation, magnetic disk based hard drives and/or solid-state drives that include one or more types of flash memory.

The term "non-transitory," as used herein, is intended to describe a computer-readable storage medium (or "memory") excluding propagating electromagnetic signals, but is not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

As noted in the disclosure, the present system may utilize public or private blockchain infrastructures, distributed ledgers, append-only databases, and the like. In one example, the presently described cryptographically secured digital assets may initially be stored/secured to a private blockchain that resides on infrastructure maintained by a single entity, or consortium of entities. Each entity may agree upon a common form, or data construct for the infrastructure, though assets of any one entity may be maintained by that entity. Such a model may provide for the sharing of network and infrastructure costs/resources, while permitting each entity to maintain their own asset independence. To further public trust, assets created on this private or semi-private blockchain may be transferrable to public chains at the discretion of the user (potentially subject to one or more conditions of transfer).

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

The enumerated claims provided herein, despite being written in claim form, should be regarded as part of the present provisional disclosure and in no way should be construed to limit what is described above. Further, each claim should be regarded as its own separate embodiment of the present disclosure.

Further aspects and embodiments of the present disclosure are provided in the following listing of clauses, which should be read in light of the disclosure above:

Clause 1. A system for displaying a digital collectable on a physical article, the system comprising: a physical article operative to be worn on the body of a user, the physical article comprising: an outward facing surface, a digital display forming at least a portion of the outward facing surface; communication circuitry in communication with digital display, the communication circuitry being operative to wirelessly receive the digital collectable and provide it to the digital display; an external computing device comprising a processor, and communication circuitry operative to wirelessly communicate with the communication circuitry of the physical article, and wherein the processor is configured to: receive the cryptographically secured digital collectable; receive an indication to display the digital collectable on the physical article; receive an article identifier from the communication circuitry of the physical article in response to receiving the indication to display the digital collectable on the physical article; transmit the digital collectable to the physical article for display on the digital display; and record the display of the digital collectable in connection with the article identifier of the physical article.

Clause 2. The system of clause 1, wherein the digital collectable is cryptographically secured on a distributed blockchain ledger and comprises a digital image; and wherein transmitting the digital collectable to the physical article for display on the digital display comprises transmitting the digital image to the physical article.

Clause 3. The system of clause 2, wherein the processor is further configured to verify the article identifier as authentic prior to transmitting the digital image to the physical article.

Clause 4. The system of clause 3, wherein the processor is configured to verify the article identifier as authentic by decoding the article identifier.

Clause 5. The system of clause 3, wherein the processor is configured to verify the article identifier as authentic by comparing the article identifier to a listing of known authentic article identifiers.

Clause 6. The system of clause 2, wherein the digital display is an electronic ink display that is operative to maintain a display of an image without a persistent power draw.

Clause 7. The system of clause 2, wherein the digital image transmitted to the physical article is derived from, though different from the cryptographically secured digital collectable.

Clause 8. The system of clause 7, wherein the digital image is a probabilistically selected image variant selected from a collection of image variants.

Clause 9. The system of clause 7, wherein the physical article is an article of footwear; and wherein digital image includes a colorway that is at least partially derived from the cryptographically secured digital collectable.

Clause 10. The system of clause 2, wherein the physical article is an article of footwear having an upper and a sole structure, and wherein the digital display is integrated into the upper.

Clause 11. The system of clause 2, wherein the digital display forms at least a portion of a logo.

Clause 12. The system of clause 2, wherein the physical article comprises an inductive power circuit operative to receive magnetic energy and power the display device.

Clause 13. The system of clause 2, wherein the communication circuitry of the physical article and the communication circuitry of the external computing device operate according to one of a Near Field Communication (NFC) or Bluetooth communication protocol.

Clause 14. The system of clause 2, wherein the received indication includes the external computing device being located within a predefined proximity of the physical article.

Clause 15. The system of clause 2, wherein the processor is configured to record the display of the digital image in connection with the article identifier of the physical article by making a request for the article identifier to be written into metadata associated with the cryptographically secured digital collectable.

Clause 16. The system of clause 2, wherein the processor is further configured to: receive an indication of at least one of a user identity or an event in which the physical article was used while displaying the digital image; and make a request for the at least one of the user identity or the event in which the physical article was used to be written into metadata associated with the cryptographically secured digital collectable.

Clause 17. The system of clause 16, wherein the request for the at least one of the user identity or the event in which the physical article was used to be written into metadata associated with the digital collectable comprises a request to append metadata contained within a sidechain referenced by the cryptographically secured digital collectable.

Clause 18. The system of clause 2, wherein the article identifier comprises an identifier unique to the communication circuitry of the physical article.

Clause 19. The system of clause 2, wherein the external computing device includes a camera, and wherein the processor is further configured to: receive a second article identifier imprinted on the physical article using the camera; and verify the physical article as authentic via both the article identifier and the second article identifier prior to transmitting the digital collectable to the physical article.

Clause 20. The system of clause 2, wherein the external computing device is further configured to transmit a request to create a second digital collectable comprising a digital replica of the physical article having displayed thereon the digital image.

Clause 21. A method of displaying a cryptographically secured digital collectable on a digital display provided on an article of footwear or apparel, the method comprising: receiving the cryptographically secured digital collectable; receiving an indication from a user to display the cryptographically secured digital collectable on the digital display provided on the article of footwear or apparel; receiving an article identifier from communication circuitry provided on the article of footwear in response to receiving the indication to display the digital collectable on the article of footwear or apparel; transmitting the cryptographically secured digital collectable to the article of footwear or apparel for display on the digital display; and recording or requesting the recordation that the cryptographically secured digital collectable is displayed in connection with the article identifier of the article of footwear or apparel.

Clause 22. The method of clause 21, wherein the cryptographically secured digital collectable that is transmitted to the article of footwear or apparel is a user-selected digital collectable; the method further comprising: receiving a plurality of cryptographically secured digital collectables, the plurality of cryptographically secured digital collectables including the selected digital collectable; and storing the plurality of cryptographically secured digital collectables in a digital wallet.

Clause 23. The method of clause 22, further comprising: filtering the plurality of cryptographically secured digital collectables to identify a subset of the plurality of cryptographically secured digital collectables that are substantially monochromatic.

Clause 24. The method of clause 23, wherein the subset of the plurality of cryptographically secured digital collectables that is substantially monochromatic includes the selected digital collectable.

Clause 25. The method of clause 22, further comprising receiving an indication from the user via the user interface to convert one of the plurality of cryptographically secured digital collectables from color to black and white.

Clause 26. The method of clause 22, further comprising receiving an indication from the user via the user interface to resize one of the plurality of cryptographically secured digital collectables.

Clause 27. The method of clause 26, wherein the resizing includes at least one of scaling a dimensional property of the cryptographically secured digital collectable, cropping the cryptographically secured digital collectable, choosing an angle of a 3D image associated with the cryptographically secured digital collectable, or choosing a frame of an animation.

Clause 28. The method of clause 22, wherein the article identifier includes an indication of a size and/or a shape of the digital display; and the method further comprising identifying a subset of the plurality of cryptographically secured digital collectables that are dimensioned to fit on the digital display according to the received indication of the size and/or shape of the digital display; and wherein the subset of the plurality of cryptographically secured digital collectables that are dimensioned to fit on the digital display includes the selected digital collectable.

Clause 29. The method of clause 22, further comprising, receiving an image of the digital display; determining a size and/or a shape of the digital display from the received image of the digital display; identifying a subset of the plurality of cryptographically secured digital collectables that are dimensioned to fit on the digital display according to the determined size and/or shape of the digital display; and wherein the subset of the plurality of cryptographically secured digital collectables that are dimensioned to fit on the digital display includes the selected digital collectable.

Clause 30. The method of clause 21, further comprising verifying the article identifier as authentic prior to transmitting the digital image to the physical article.

Clause 31. The method of clause 30, wherein verifying the article identifier as authentic comprises decoding the article identifier.

Clause 32. The method of clause 30, wherein verifying the article identifier as authentic comprises comparing the article identifier to a listing of known authentic article identifiers.

Clause 33. The method of clause 21, further comprising: receiving an indication of at least one of a user identity or an event in which the article of footwear or apparel was used while displaying the digital image; and making a request for the at least one of the user identity or the event in which the article of footwear or apparel was used to be written into metadata associated with the cryptographically secured digital collectable.

Clause 34. The method of clause 33, wherein the request for the at least one of the user identity or the event in which the article of footwear or apparel was used to be written into metadata associated with the digital collectable comprises a request to append metadata contained within a sidechain referenced by the cryptographically secured digital collectable.

Clause 35. The method of clause 21, wherein the digital display comprises an electronic ink display.

Clause 36. The method of clause 21, wherein transmitting the cryptographically secured digital collectable to the article of footwear or apparel for display on the digital display comprises: wirelessly transmitting the cryptographically secured digital collectable to the article of footwear or apparel via a Near Field Communications (NFC) protocol.

Clause 37. The method of clause 36, wherein the article of footwear or apparel is an article of footwear comprising an upper and a sole structure, the upper including an NFC antenna; and wherein wirelessly transmitting the cryptographically secured digital collectable to the article of footwear or apparel comprises wirelessly transmitting the cryptographically secured digital collectable to the NFC antenna.

Clause 38. The method of clause 37, further comprising providing an inductive charge to the article of footwear via the NFC antenna.

Clause 39. The method of clause 37, wherein the received indication from the user to display the cryptographically secured digital collectable comprises a separation distance between a computing device and the NFC antenna being below a predefined distance threshold.

Clause 41. A method of displaying a cryptographically secured digital collectable on a digital display provided on an outward facing surface of an upper of an article of footwear, the method comprising: receiving the cryptographically secured digital collectable from a distributed blockchain ledger and/or an internet-connected digital file repository; storing or associating the received cryptographically secured digital collectable with a digital wallet associated with a computing device, the computing device including a user interface; receiving an indication from a user via the user interface to display the cryptographically secured digital collectable on the digital display of the article of footwear; opening a communication channel between communication circuitry of the computing device and communication circuitry electrically coupled with the digital display on the article of footwear; wirelessly transmitting the cryptographically secured digital collectable to the communication circuitry of the article of footwear and instructing the digital display to display the transmitted cryptographically secured digital collectable.

Clause 42. The method of clause 41, further comprising: receiving an article identifier from the communication circuitry of the article of footwear; and verifying the authenticity of the article of footwear via the received article identifier; and wirelessly transmitting the cryptographically secured digital collectable to the communication circuitry of the article of footwear only if the article of footwear is verified as authentic.

Clause 43. The method of clause 41, further comprising: receiving an article identifier from the communication circuitry of the article of footwear; and recording or requesting the recordation of the article identifier into metadata associated with the cryptographically secured digital collectable.

Clause 44. The method of clause 41, wherein the digital display comprises an electronic ink display and wherein the cryptographically secured digital collectable comprises a digital image; and wherein instructing the digital display to display the transmitted cryptographically secured digital collectable comprises instructing the electronic ink display to display the digital image.

Clause 45. The method of clause 41, wherein the communication circuitry of the article of footwear includes a wireless antenna provided in or on a sidewall of the upper; and wherein wirelessly transmitting the cryptographically secured digital collectable to the communication circuitry of the article of footwear includes wirelessly transmitting the cryptographically secured digital collectable to the antenna provided in or on the sidewall of the upper.

Clause 46. The method of clause 41, wherein the cryptographically secured digital collectable that is wirelessly transmitted to the article of footwear is a user-selected digital collectable; the method further comprising: receiving a plurality of cryptographically secured digital collectables, the plurality of cryptographically secured digital collectables including the user-selected digital collectable; and storing or associating the plurality of cryptographically secured digital collectables with the digital wallet.

Clause 47. The method of clause 46, further comprising: filtering the plurality of cryptographically secured digital collectables to identify a subset of the plurality of cryptographically secured digital collectables that are substantially monochromatic.

Clause 48. The method of clause 47, wherein the subset of the plurality of cryptographically secured digital collectables that is substantially monochromatic includes the selected digital collectable.

Clause 49. The method of clause 46, further comprising receiving an indication from the user via the user interface to convert one of the plurality of cryptographically secured digital collectables from color to black and white.

Clause 50. The method of clause 46, further comprising receiving an indication from the user via the user interface to resize one of the plurality of cryptographically secured digital collectables.

Clause 51. The method of clause 50, wherein the resizing includes at least one of scaling a dimensional property of the cryptographically secured digital collectable, cropping the cryptographically secured digital collectable, choosing an angle of a 3D image associated with the cryptographically secured digital collectable, or choosing a frame of an animation.

Clause 52. The method of clause 46, wherein the article identifier includes an indication of a size and/or a shape of the digital display; and the method further comprising identifying a subset of the plurality of cryptographically secured digital collectables that are dimensioned to fit on the digital display according to the received indication of the size and/or shape of the digital display; and wherein the subset of the plurality of cryptographically secured digital collectables that are dimensioned to fit on the digital display includes the selected digital collectable.

Clause 53. The method of clause 46, further comprising, receiving an image of the digital display; determining a size and/or a shape of the digital display from the received image of the digital display; identifying a subset of the plurality of cryptographically secured digital collectables that are dimensioned to fit on the digital display according to the determined size and/or shape of the digital display; and wherein the subset of the plurality of cryptographically secured digital collectables that are dimensioned to fit on the digital display includes the selected digital collectable.

Clause 54. The method of clause 41, further comprising: receiving an indication of at least one of a user identity or an event in which the article of footwear was used while displaying the digital image; and making a request for the at least one of the user identity or the event in which the article of footwear was used to be written into metadata associated with the cryptographically secured digital collectable.

Clause 55. The method of clause 54, wherein the request for the at least one of the user identity or the event in which the article of footwear or apparel was used to be written into metadata associated with the digital collectable comprises a request to append metadata contained within a sidechain referenced by the cryptographically secured digital collectable.

Clause 61. A system for displaying a digital collectable on a physical article, the system comprising: a physical article operative to be worn on the body of a user, the physical article comprising: an outward facing surface, a digital display forming at least a portion of the outward facing surface; communication circuitry in communication with digital display, the communication circuitry being operative to wirelessly receive the digital collectable and provide it to the digital display; a non-transitory computer readable medium having stored thereon program instructions that when executed by a computing device cause the computing device to: receive the cryptographically secured digital collectable from a distributed blockchain ledger and/or an internet-connected digital file repository; store or associating the received cryptographically secured digital collectable with a digital wallet associated with a computing device; receive an indication from a user via a user interface of the computing device to display the cryptographically secured digital collectable on the digital display of the physical article; open a communication channel between communication circuitry of the computing device and communication circuitry of the physical article; wirelessly transmit the cryptographically secured digital collectable to the communication circuitry of the physical article and instructing the digital display to display the transmitted cryptographically secured digital collectable.

Clause 62. The system of clause 61, further comprising: wherein, in response to a request from the computing device, the communication circuitry of the physical article is operative to transmit an article identifier from the communication circuitry of the physical article; and wherein the program instructions, when executed by the computing device, further cause the computing device to: receive the article identifier from the physical article; verify the authenticity of the article of footwear via the received article identifier; and wirelessly transmitting the cryptographically secured digital collectable to the communication circuitry of the physical article only if the physical article is verified as authentic.

Clause 63. The system of clause 61, further comprising: wherein, in response to a request from the computing device, the communication circuitry of the physical article is operative to transmit an article identifier from the communication circuitry of the physical article; and wherein the program instructions, when executed by the computing device, further cause the computing device to: record or request the recordation of the article identifier into metadata associated with the cryptographically secured digital collectable.

Clause 64. The system of clause 61, wherein the digital display comprises an electronic ink display.

Clause 65. The system of clause 61, wherein the physical article further comprises a wireless communication antenna.

Clause 66. The system of clause 65, wherein the physical article is an article of footwear comprising an upper and a sole structure, and wherein the wireless communication antenna is integrated into a sidewall of the upper.

Clause 67. The system of clause 66, wherein the communication circuitry is embedded within the sole structure.

Clause 68. The system of clause 67, wherein the digital display forms at least a portion of the outward facing surface of the upper.

Clause 69. The system of clause 68, wherein the wireless communication antenna is a near field communication antenna.

Clause 71. A method of displaying an image obtained from a video game platform on a display device provided on a shoe, the method comprising: receiving user login credentials for the video game platform; authenticating the user login credentials with the video game platform; upon authentication, querying the video game platform for images associated with the user's profile, the images comprising at least one of: an avatar image, an achievement image, a trophy image, a game branding image, or a banner image; receiving from the video game platform a user-selected image in response to a user selection of one of the queried images; processing the user-selected image by at least one of: scaling, cropping, converting to black and white, converting to monochrome, changing orientation, overlaying with a filter, overlaying with a frame, or animating; establishing a communication link between a computing device and the display device integrated on the shoe; transmitting the processed user-selected image to the display device on the shoe; and displaying the processed user-selected image on the display device.

Clause 72. The method of claim 71, wherein establishing the communication link comprises establishing a Bluetooth communication link.

Clause 73. The method of claim 71, wherein establishing the communication link comprises bringing the computing device within proximity of a near field communication (NFC) antenna integrated on the shoe.

Clause 74. The method of claim 71, wherein processing the user-selected image comprises converting a color image to monochrome.

Clause 75. The method of claim 71, wherein processing the user-selected image comprises scaling the image to fit within pixels of the display device.

Clause 76. The method of claim 71, wherein processing the user-selected image comprises cropping peripheral areas of the image.

Clause 77. The method of claim 71, wherein processing the user-selected image comprises overlaying the image with a frame graphic.

Clause 78. The method of claim 71, wherein the display device comprises an electronic paper display or an organic light emitting diode (OLED) display.

Clause 79. The method of claim 71, further comprising: receiving an identifier from the display device on the shoe; and recording an association between the display device identifier and the displayed image.

Clause 80. A method of displaying an image from a video game platform on an article of apparel display device, the method comprising: receiving a user selection of an image type, the image type comprising one of: an avatar, an achievement badge, or a game logo; querying a video game platform for images associated with a user profile according to the selected image type; receiving a user-selected image in response to a user selection of one of the queried images; processing the user-selected image based on display capabilities of the article of apparel display device; establishing a wireless communication link between a computing device and the article of apparel display device; transmitting the processed user-selected image to the article of apparel display device via the wireless communication link; and displaying the processed user-selected image on the article of apparel display device.

The invention claimed is:

1. A method of displaying a cryptographically secured digital collectable on a digital display provided on an article of footwear or apparel, the method comprising:
   receiving the cryptographically secured digital collectable;
   receiving an indication from a user to display the cryptographically secured digital collectable on the digital display provided on the article of footwear or apparel;
   receiving an article identifier from communication circuitry provided on the article of footwear or apparel in response to receiving the indication to display the digital collectable on the article of footwear or apparel, wherein the article identifier is unique to the article of footwear or apparel;
   transmitting the cryptographically secured digital collectable to the article of footwear or apparel for display on the digital display; and
   recording or requesting a recordation of an indication that the cryptographically secured digital collectable is displayed on the article of footwear or apparel, and wherein the indication associates the article identifier with the digital collectable.

2. The method of claim 1, wherein the cryptographically secured digital collectable that is transmitted to the article of footwear or apparel is a user-selected digital collectable; the method further comprising:
   receiving a plurality of cryptographically secured digital collectables, the plurality of cryptographically secured digital collectables including the selected digital collectable; and
   storing the plurality of cryptographically secured digital collectables in a digital wallet.

3. The method of claim 2, further comprising: filtering the plurality of cryptographically secured digital collectables to identify a subset of the plurality of cryptographically secured digital collectables that are monochromatic.

4. The method of claim 3, wherein the subset of the plurality of cryptographically secured digital collectables that is monochromatic includes the selected digital collectable.

5. The method of claim 2, further comprising receiving an indication from the user via the user interface to convert one of the plurality of cryptographically secured digital collectables from color to black and white.

6. The method of claim 2, further comprising receiving an indication from the user via the user interface to resize one of the plurality of cryptographically secured digital collectables.

7. The method of claim 6, wherein the resizing includes at least one of scaling a dimensional property of the cryptographically secured digital collectable, cropping the cryptographically secured digital collectable, choosing an angle of a 3D image associated with the cryptographically secured digital collectable, or choosing a frame of an animation.

8. The method of claim 2, wherein the article identifier includes an indication of a size and/or a shape of the digital display; and
   the method further comprising identifying a subset of the plurality of cryptographically secured digital collectables that are dimensioned to fit on the digital display according to the received indication of the size and/or shape of the digital display; and wherein the subset of the plurality of cryptographically secured digital collectables that are dimensioned to fit on the digital display includes the selected digital collectable.

9. The method of claim 2, further comprising, receiving an image of the digital display;
determining a size and/or a shape of the digital display from the received image of the digital display;
identifying a subset of the plurality of cryptographically secured digital collectables that are dimensioned to fit on the digital display according to the determined size and/or shape of the digital display; and
wherein the subset of the plurality of cryptographically secured digital collectables that are dimensioned to fit on the digital display includes the selected digital collectable.

10. The method of claim 1, further comprising verifying the article identifier as authentic prior to transmitting the digital image to the physical article.

11. The method of claim 10, wherein verifying the article identifier as authentic comprises decoding the article identifier.

12. The method of claim 10, wherein verifying the article identifier as authentic comprises comparing the article identifier to a listing of known authentic article identifiers.

13. The method of claim 1, further comprising:
receiving an indication of at least one of a user identity or an event in which the article of footwear or apparel was used while displaying the digital image; and
making a request for the at least one of the user identity or the event in which the article of footwear or apparel was used to be written into metadata associated with the cryptographically secured digital collectable.

14. The method of claim 13, wherein the request for the at least one of the user identity or the event in which the article of footwear or apparel was used to be written into metadata associated with the digital collectable comprises a request to append metadata contained within a sidechain referenced by the cryptographically secured digital collectable.

15. The method of claim 1, wherein the digital display comprises an electronic ink display.

16. The method of claim 1, wherein transmitting the cryptographically secured digital collectable to the article of footwear or apparel for display on the digital display comprises:
wirelessly transmitting the cryptographically secured digital collectable to the article of footwear or apparel via a Near Field Communications (NFC) protocol.

17. The method of claim 16, wherein the article of footwear or apparel is an article of footwear comprising an upper and a sole structure, the upper including an NFC antenna; and
wherein wirelessly transmitting the cryptographically secured digital collectable to the article of footwear or apparel comprises wirelessly transmitting the cryptographically secured digital collectable to the NFC antenna.

18. The method of claim 17, further comprising providing an inductive charge to the article of footwear via the NFC antenna.

19. The method of claim 17, wherein the received indication from the user to display the cryptographically secured digital collectable comprises a separation distance between a computing device and the NFC antenna being below a predefined distance threshold.

20. A method of displaying an image obtained from a video game platform on a display device provided on a shoe, the method comprising:
receiving user login credentials for the video game platform;
authenticating the user login credentials with the video game platform;
upon authentication, querying the video game platform for images associated with the user's profile, the images comprising at least one of: an avatar image, an achievement image, a trophy image, a game branding image, or a banner image;
receiving from the video game platform a user-selected image in response to a user selection of one of the queried images;
processing the user-selected image by at least one of: scaling, cropping, converting to black and white, converting to monochrome, changing orientation, overlaying with a filter, overlaying with a frame, or animating;
establishing a communication link between a computing device and the display device integrated on the shoe;
transmitting the processed user-selected image to the display device on the shoe; and
displaying the processed user-selected image on the display device;
receiving an article identifier from communication circuitry provided in communication with the display device, wherein the article identifier is unique to the display device or shoe; and
recording an indication that the user-selected image is displayed on the display device, and wherein the indication associates the article identifier with the user-selected image.

* * * * *